United States Patent
Shimonishi et al.

(10) Patent No.: US 10,047,906 B2
(45) Date of Patent: Aug. 14, 2018

(54) COUPLER

(71) Applicant: SHIMONISHI SEISAKUSHO CO., LTD., Higashi-Osaka-shi, Osaka (JP)

(72) Inventors: Toru Shimonishi, Higashi-Osaka (JP); Tsuyoshi Shimonishi, Higashi-Osaka (JP); Keiichi Ueda, Higashi-Osaka (JP)

(73) Assignee: SHIMONISHI SEISAKUSHO CO., LTD., Higashi-Osaka-Shi, Osaka (JP)

( * ) Notice: Subject to any disclaimer, the term of this patent is extended or adjusted under 35 U.S.C. 154(b) by 4 days.

(21) Appl. No.: 15/508,016

(22) PCT Filed: Aug. 28, 2015

(86) PCT No.: PCT/JP2015/074460
§ 371 (c)(1),
(2) Date: Mar. 1, 2017

(87) PCT Pub. No.: WO2016/035712
PCT Pub. Date: Mar. 10, 2016

(65) Prior Publication Data
US 2017/0284598 A1     Oct. 5, 2017

(30) Foreign Application Priority Data
Sep. 2, 2014     (JP) ................................. 2014-178183

(51) Int. Cl.
*G03B 17/56*     (2006.01)
*F16M 13/04*     (2006.01)
(Continued)

(52) U.S. Cl.
CPC ............. *F16M 13/04* (2013.01); *G03B 17/16* (2013.01); *G03B 17/566* (2013.01);
(Continued)

(58) Field of Classification Search
CPC ...................................................... G03B 17/56
(Continued)

(56) References Cited

U.S. PATENT DOCUMENTS

| 8,047,729 | B2 | 11/2011 | Kope et al. |
| 2010/0176173 | A1 | 7/2010 | Felts |

(Continued)

FOREIGN PATENT DOCUMENTS

| JP | 57-188826 U1 | 11/1982 |
| JP | 8-214051 A | 8/1996 |

(Continued)

*Primary Examiner* — Clayton E Laballe
*Assistant Examiner* — Kevin Butler
(74) *Attorney, Agent, or Firm* — Birch, Stewart, Kolasch & Birch, LLP

(57) ABSTRACT

To make it possible to simply and easily attach/detach an attaching target to/from an attached target. A coupler includes: a base to be fixed to an attached target; and an attachment body that is fixed to the attaching target and to be detachably joined to the base, in which: the base includes a joint surface to be joined to the attachment body, a magnet configured to magnetically attach the attachment body to the joint surface, and an engaging part configured to engage with the attachment body; and the attachment body includes a joint surface to be joined to the base, a magnet configured to magnetically attach the magnet of the base to the joint surface, and an engaged part configured to disengageably engage with the engaging part of the base and restrict separation from the base.

10 Claims, 20 Drawing Sheets

(51) Int. Cl.
 *G03B 17/16* (2006.01)
 *A45F 5/00* (2006.01)
 *A45C 11/38* (2006.01)

(52) U.S. Cl.
 CPC ............ *G03B 17/568* (2013.01); *A45C 11/38* (2013.01); *A45F 5/00* (2013.01); *A45F 2200/0533* (2013.01); *G03B 17/56* (2013.01)

(58) Field of Classification Search
 USPC ........................................................ 396/423
 See application file for complete search history.

(56) References Cited

U.S. PATENT DOCUMENTS

2010/0283269 A1* 11/2010 Fiedler ................ A44B 11/258
 292/251.5
2014/0159840 A1 6/2014 Qadri
2017/0284598 A1* 10/2017 Shimonishi ............ F16M 13/04

FOREIGN PATENT DOCUMENTS

| | | | | |
|---|---|---|---|---|
| JP | 10-66614 A | | 3/1998 | |
| JP | H1066614 | * | 3/1998 | ............. A45C 11/00 |
| JP | 10-165208 A | | 6/1998 | |
| JP | 2002-262921 A | | 9/2002 | |
| JP | 2002-272525 A | | 9/2002 | |
| JP | 2003-275831 A | | 9/2003 | |
| JP | 2006-234035 A | | 9/2006 | |
| JP | 2006234035 | * | 9/2006 | ............. F16B 19/00 |
| JP | 2007-144016 A | | 6/2007 | |
| JP | 2008-298160 A | | 12/2008 | |
| JP | 2008298160 | * | 12/2008 | ............. A47B 97/00 |
| JP | 2009-35078 A | | 2/2009 | |
| JP | 2009-542380 A | | 12/2009 | |
| JP | 2010-525400 A | | 7/2010 | |
| JP | 2010-190355 A | | 9/2010 | |
| JP | 2010190355 | * | 9/2010 | ............... B60H 1/34 |
| JP | 2010-286082 A | | 12/2010 | |
| JP | 2014-20544 A | | 2/2014 | |
| JP | 2014020544 | * | 2/2014 | ................ F16B 5/02 |
| WO | WO 2012/141004 A1 | | 10/2012 | |

* cited by examiner

US 10,047,906 B2

COUPLER

TECHNICAL FIELD

The present invention relates to a coupler for coupling an attaching target to an attached target.

BACKGROUND ART

As a coupler used to couple an attaching target to an attached target, for example, in the field of cameras, there is one used for a sling as disclosed in Patent Literature 1 below. The sling in Patent Literature 1 is one for making it possible for a user of a camera to carry the camera with both hands free, and includes an annular-shaped shoulder strap and a coupler attached to the shoulder strap. The coupler is a single member that is not a separable structure, and used to couple the shoulder strap obliquely slung over the body of the user and the camera together. The coupler includes a male screw part, and by screwing the mail screw part into a female screw part of the camera, the camera is fixed to the coupler.

CITATION LIST

Patent Literature

Patent Literature 1: U.S. Pat. No. 8,047,729

SUMMARY OF INVENTION

Technical Problem

Since the coupler of the sling in Patent Literature 1 is not a separable structure, it may be difficult to attach/detach the camera as an attaching target to the shoulder strap as an attached target. That is, to couple the shoulder strap and the camera together, the male screw part of the coupler has to be accurately positioned with respect to the female screw part of the camera to screw the male screw part into the female screw part. Such work may be difficult in a place such as a place where the field of view is limited, or a place where motions become unstable because of narrowness, poor footing, or the like.

The present invention is made in consideration of the above-described problem, and intends to provide a coupler capable of easily attaching/detaching an attaching target to an attached target.

The present invention intends to provide a coupler capable of simply and easily attaching/detaching an attaching target to an attached target by using magnets to simply and easily magnetically attach an attachment body attached to the attaching target to a base attached to the attached target.

Solution to Problem

Specific means configured to solve the problem in the present invention are as follows.

First, the coupler includes: a base to be fixed to an attached target; and an attachment body that is fixed to an attaching target and to be detachably joined to the base, in which: the base includes a joint surface to be joined to the attachment body, a magnet configured to magnetically attach the attachment body to the joint surface, and an engaging part configured to engage with the attachment body; and the attachment body includes a joint surface to be joined to the base, a magnet configured to magnetically attach the joint surface to the magnet of the base, and an engaged part configured to disengageably engage with the engaging part of the base and restrict separation from the base.

This configuration makes it possible to, by attaching/detaching the attachment body to/from the base using the magnets, simply and easily attach/detach the attaching target to/from the attached target.

Second, the back surface of the base includes a fixing member to be fixed to the attached target, and the front surface of the attachment body includes an attachment tool attached to the attaching target.

This configuration makes it easy to attach the base to the attached target and attach the attaching target to the attachment body.

Third, the magnet of the base includes two magnets having different surface poles, and the magnet of the attachment body includes two magnets that are to be attracted and guided by the magnet of the base.

This configuration makes it easy to position the attachment body with respect to the base.

Fourth, the base includes a guide member formed including left and right side guide parts configured to guide the position of the attachment body in a left-right direction at a time of magnetic attachment, and a lower guide part configured to guide a downward position.

This configuration makes it possible to join the attachment body to the base in a proper position.

Fifth, the engaging part of the base and the engaged part of the attachment body are provided below the joint surface of the base and below the joint surface of the attachment body, respectively, and one is a protrusion protruding in a top-bottom direction, whereas the other includes a hole and a hole wall part that are configured to disengageably engage with the protrusion in the top-bottom direction.

This configuration makes it possible to restrict the lower part of the attachment body from unexpectedly separate from the base.

Sixth, the engaging part of the base and the engaged part of the attachment body are provided above the joint surface of the base and above the joint surface of the attachment body, respectively, and one is a hook part protruding from the joint surface, whereas the other includes an opening part into or out of which the hook part is capable of being moved by joint direction relative movement, and a locking part configured to be engaged with the hook part.

This configuration makes it possible to restrict the upper part of the attachment body from unexpectedly separate from the base.

Seventh, the base is provided with a locking mechanism configured to restrict the hook part engaging with the locking part from relatively moving in a detachment direction.

This configuration makes it possible to restrict the attachment body from unexpectedly separating and to surely keep the coupling between the base and the attachment body.

Eighth, the attachment body is formed with the hook part, and the base is formed with the opening part and the locking part; and the locking mechanism includes a locking hole formed in the hook part, an engaging pin that is provided to the base and by protruding into the opening part, inserted into the locking hole to restrict the hook part from relatively moving in the detachment direction; and a spring that biases the engaging pin in a protruding direction.

This configuration makes it possible to simply and easily form the locking mechanism.

Ninth, the locking mechanism includes: an operation knob slidably attached to the base; and an interlocking member configured to move back the engaging pin from the opening part by sliding of the operation knob.

This configuration makes it possible to perform an engaging/disengaging operation of the engaging pin by a sliding operation of the operation knob.

Tenth, the base is formed with the hook part, and the attachment body is formed with the opening part and the locking part; and the locking mechanism includes an operation body that is provided in the base, faces to the hook part, sandwiching the locking part, and thereby restricts the hook part from relatively moving in the detachment direction, a spring that biases the operation body to a position facing to the hook part, and an operation knob configured to move back the operation body from the position facing to the hook part while resisting the spring.

This configuration makes it possible to simply and easily form a mechanism that restricts the hook part from relatively moving in the detachment direction and unlocks the restriction by sliding of the operation knob, and to form the joint surface side of the attachment body as a smooth flat surface.

Eleventh, the attachment tool includes: a male screw part that is rotationally movably provided to the attachment body and capable of being screwed to the attaching target, or a movable claw that is provided on the front surface of the attachment body and capable of sandwiching the attaching target.

This configuration makes it easy to attach/detach the attachment body to/from the attaching target.

Advantageous Effects of Invention

According to the present invention, the attaching target can be easily attached/detached to/from the attached target by using the magnets to simply and easily magnetically attach the attachment body attached to the attaching target to the base attached to the attached target.

DESCRIPTION OF EMBODIMENTS

Figure 1:
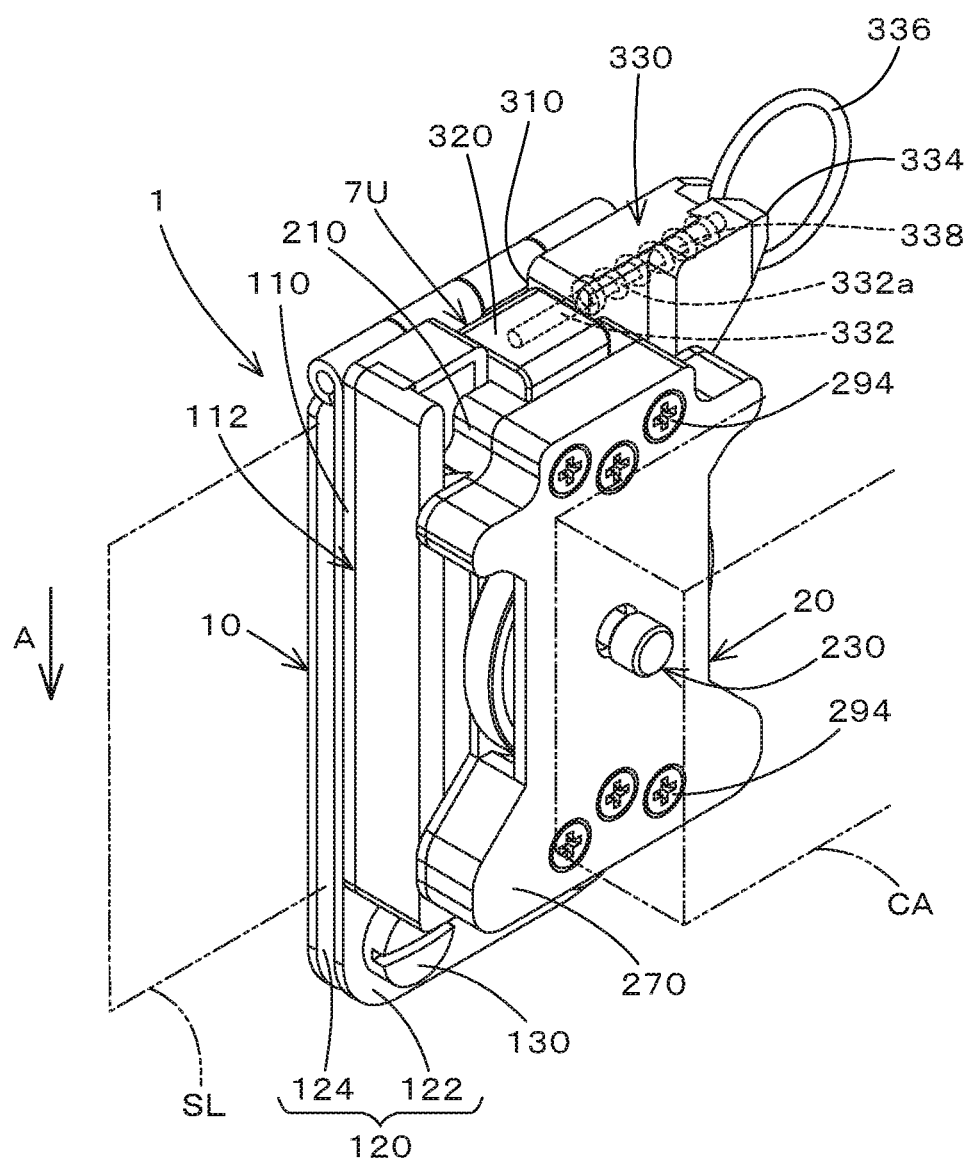
FIG. 1 is a perspective view of a coupler in a first embodiment of the present invention, in which a base and an attachment body are coupled together.
Figure 2:
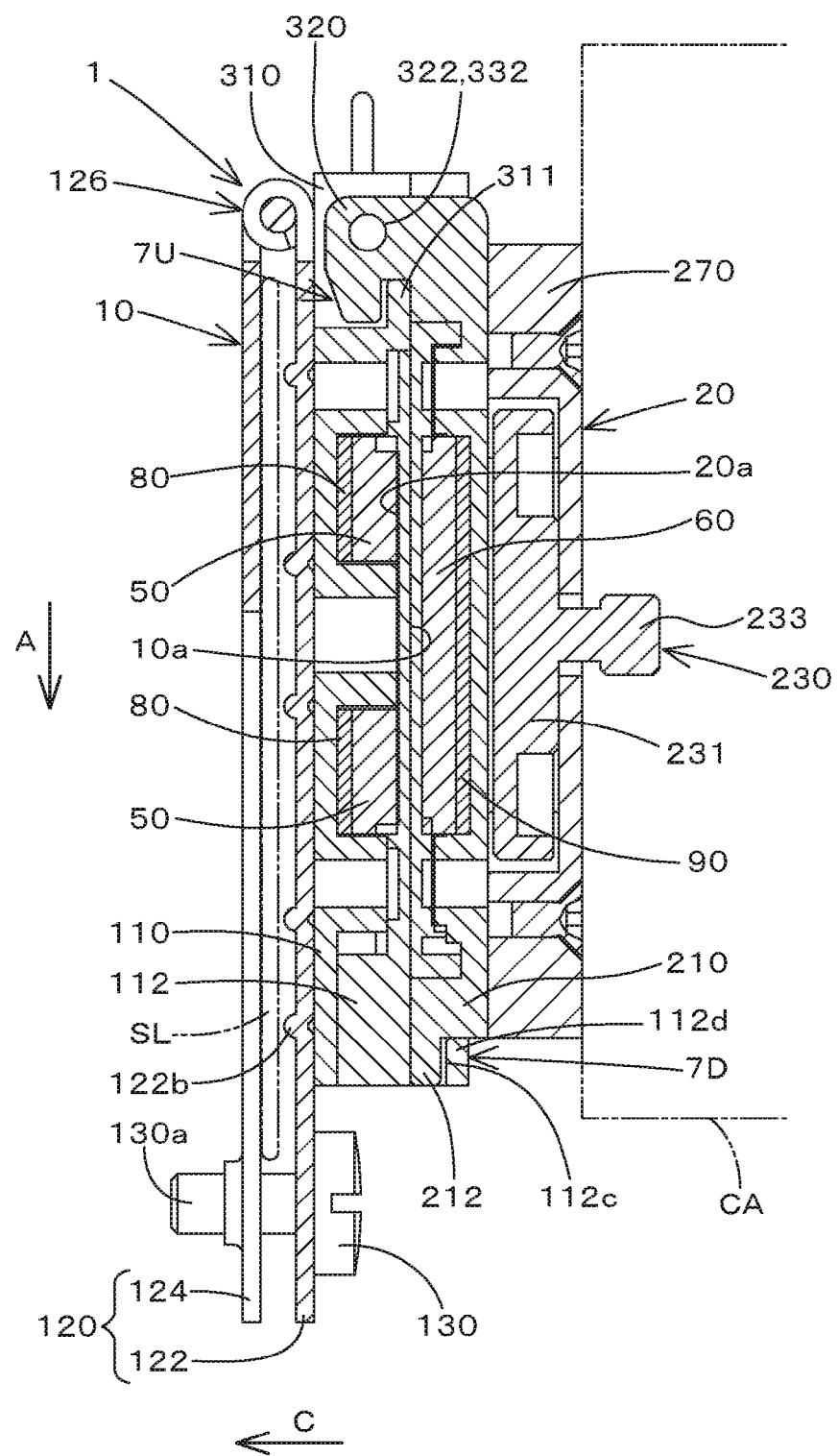
FIG. 2 is a vertical cross-sectional view of the coupler in FIG. 1.

In the following, embodiments of the present invention will be described on the basis of the drawings.

First Embodiment

FIGS. 1 to 6 illustrate a first embodiment of the present invention, in which a coupler 1 roughly includes: a base 10 to be attached to an attached target SL; and an attachment body 20 that is attached to an attaching target CA and to be detachably coupled to a joint surface 10a of the base 10, and each of them is formed of metal, light metal, resin, or the like.

The base 10 and the attachment body 20 include: magnets 50, 60 configured to magnetically attach the attachment body 20 to the base 10; a guiding mechanism 6 configured to guide the magnetic attachment position of the attachment body 20 with respect to the base 10; and restricting mechanisms 7 (7D, 7U) configured to restrict the attachment body 20 in a magnetic attachment state from separating from the base 10.

Figure 4:
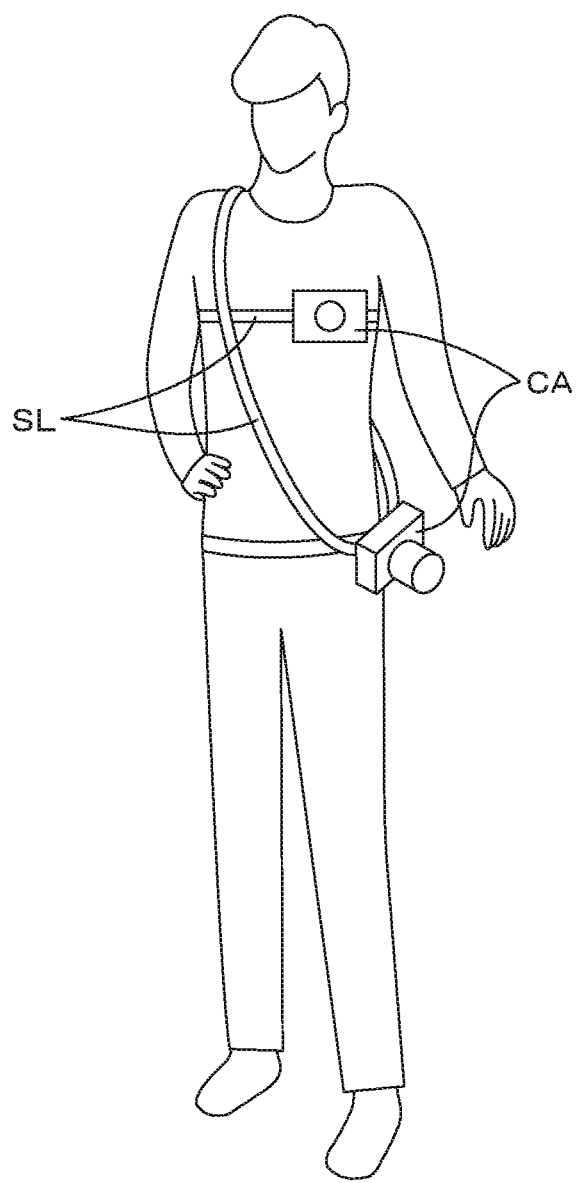
FIG. 4 is a perspective view illustrating an example of using the coupler.

The attached target SL is a sling, a belt, or the like used in order for a camera user to carry the attaching target (camera) CA with both hands free, and in FIG. 4, the camera CA is separably coupled to a shoulder strap SL or a chest strap SL.

In addition, in the coupler 1, it is defined that a side where the attaching target CA is attached is a front surface side, and a top, bottom, left, and right are those when a state where the chest strap SL is attached is viewed from the front surface (front) side. Also, the arrow A in FIGS. 1 to 3, 5, and 6 represents an attachment direction.

The base 10 is a first coupling member serving as a base for the coupler 1, and includes: a main body 110; a guide member 112 that blocks the front surface side of the main body 110; and a fixing member 120 that has a hinge part 126 on the back surface of the main body 110 and is openable/closable.

The fixing member 120 is such that a fixed plate 122 and a movable plate 124 are coupled together by the hinge part 126, and by sandwiching the attached target SL between the fixed plate 122 and the movable plate 124, the base 10 is attached to the attached target SL.

The fixed plate 122 is fixed to the back surface of the main body 110 by screws 140 and has multiple protruding ribs 122b on the back surface, and the lower part protrudes downward long from the main body 110 and is formed with a pair of through-holes 122a.

The movable plate 124 has a slit-shaped cutout part 124a to thereby form an inverted U-shape, and when the attached target SL has a sewn part, the cutout part 124a can receive it. The left and right lower parts of the movable plate 124 are formed with a pair of screw holes 124b, and by screwing male screw parts 130a of fixing screws 130 inserted from the through-holes 122a, and the movable plate 124 is fixed to the fixed plate 122.

On the main body 110, two plate-shaped magnets 50 and plate-shaped yokes 80 that are long in the left-right direction are arranged in two stages, i.e., upper and lower stages. The two magnets 50 are magnetized such that the lines of magnetic forces lie in the front-back direction.

The guide member 112 is formed of a material having good slidability and wear resistance (e.g., engineering plastic), the front surface thereof serves as the joint surface 10a, and around the front surface, a pair of parallel extending left and right side guide parts 112a and a lower guide part 112b connecting the lower ends of the side guide parts 112a are formed so as to protrude toward the attachment body 20 side.

When the attachment body 20 is joined (indicated by the arrow C direction in FIGS. 2, 3, and 5), the side guide parts 112a guide a left-right direction position, whereas the lower guide part 112b sets a lower position when the attachment body 20 is joined, and both constitute the guiding mechanism 6 configured to guide the magnetic attachment position of the attachment body 20 with respect to the base 10.

In the lower guide part 112b of the guide member 112, a through-hole 112c penetrating in the top-bottom direction is bored, the wall of the through-hole 112c on the attachment body 20 side is a hole wall part 112d, and both constitute the lower restricting mechanism 7D together with a protrusion 212 formed in the lower part of the attachment body 20. The lower restricting mechanism 7D is such that considering the through-hole 112c and the hole wall part 112d as an engaging part, the protrusion 212 to engage with them serves as an engaged part.

In the upper part of the main body 110, an opening part 310 and a locking part 311 protruding upward from the lower edge of the opening part 310 are formed, and constitute the upper restricting mechanism 7U together with a hook part 320 formed in the upper part of the attachment body 20. The upper restriction mechanism 7U is such that considering the opening part 310 and the locking part 311 as an engaging part, the hook part 320 to engage with them serves as an engaged part.

The upper part of the base 10 is such that both of the left and right sides of the opening part 310 are formed by uniting the main body 110 and the guide member 112, and inside the main body 110 on one of the left and right sides (right side) of the opening part 310, a locking mechanism 330 is provided.

The locking mechanism 330 includes: an engaging pin 332 that is movable into and out of the opening part 310; a spring 338 that biases the engaging pin 332 in a protruding direction; an operation part 336 that is coupled to the base part of the engaging pin 332 to perform a pulling operation of the engaging pin 332; and support parts 334 that are formed at the upper right ends of the main body 110 and the guide member 112 and restrict the operation part 336 subjected to the pulling operation from returning back.

The engaging pin 332 is supported at the upper end part of the main body 110 slidably in the protruding direction (indicated as the arrow B direction in FIG. 5) and rotationally movably around an axis, and the fore end thereof is to engage with a locking hole 322 of the hook part 320 of the attachment body 20 to be inserted into the opening part 310.

Figure 5:
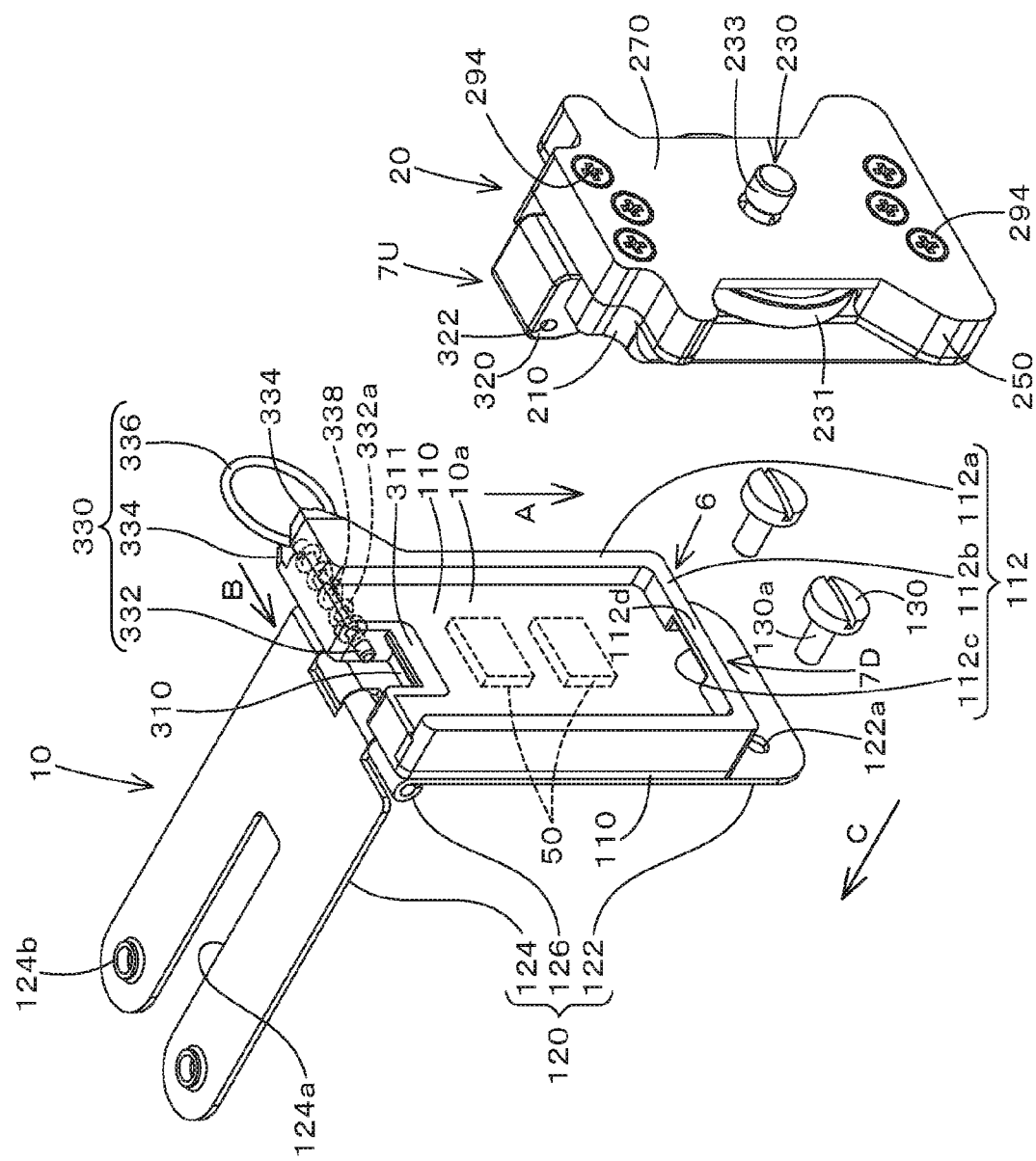
FIG. 5 is a front side perspective view of the state where the base and the attachment body are separated.

As illustrated in FIG. 5, the operation part 336 formed as a ring is inserted between the pair of support parts 334 in a vertical state, the fore end of the engaging pin 332 protrudes into the opening part 310, and when pulling the operation part 336 while resisting the spring 338, the fore end of the engaging pin 332 enters the base 10. When rotationally moving the operation part 336 in a pulled state from the vertical posture to the horizontal posture, the operation part 336 is made engageable with engaging grooves 334a of the support parts 334, and when engaging the operation part 336 with the engaging grooves 334a, a return action is restricted and the engaging pin 332 is kept entering, thus entering an unlocked state.

Figure 6:
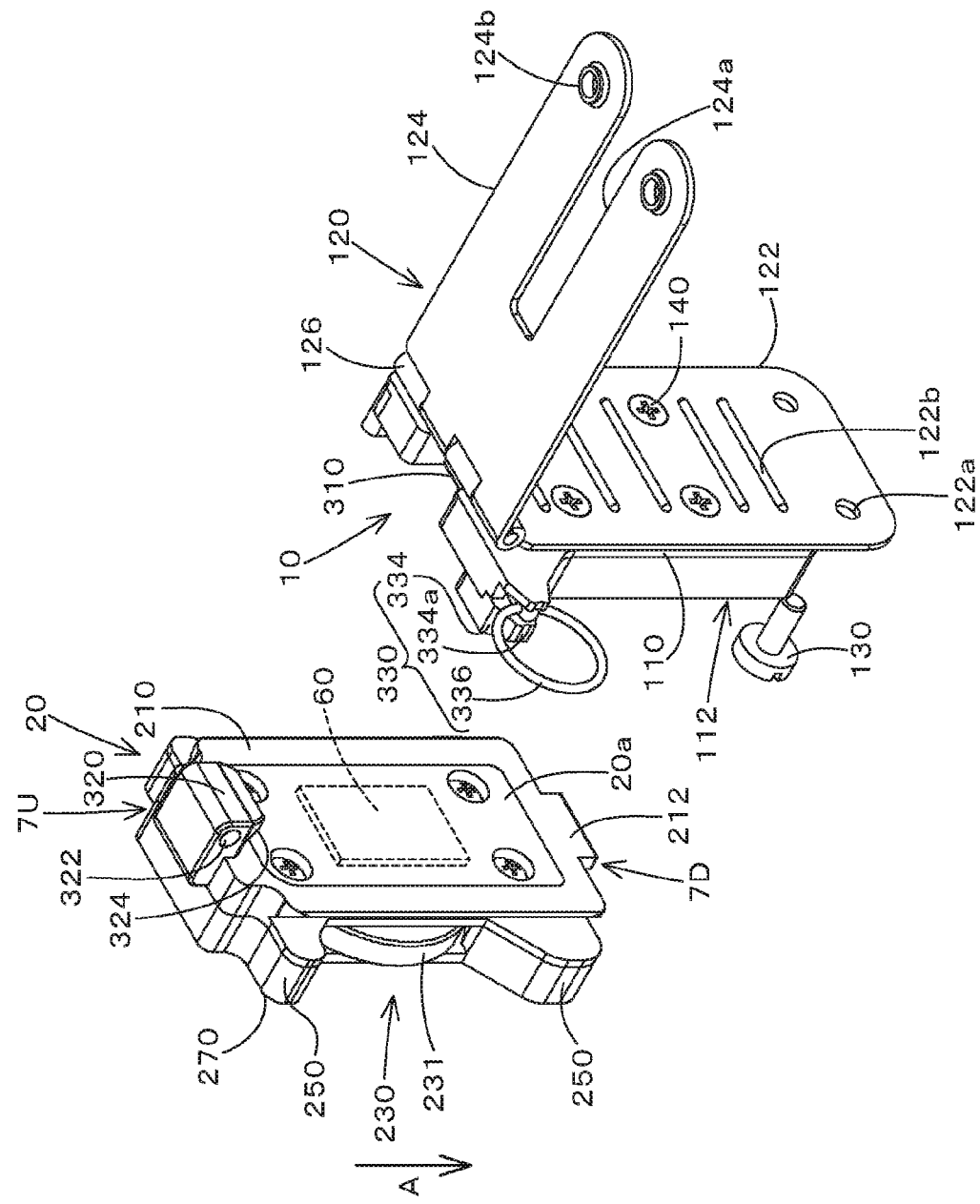
FIG. 6 is a back side perspective view of the state where the base and the attachment body are separated.
Figure 7:
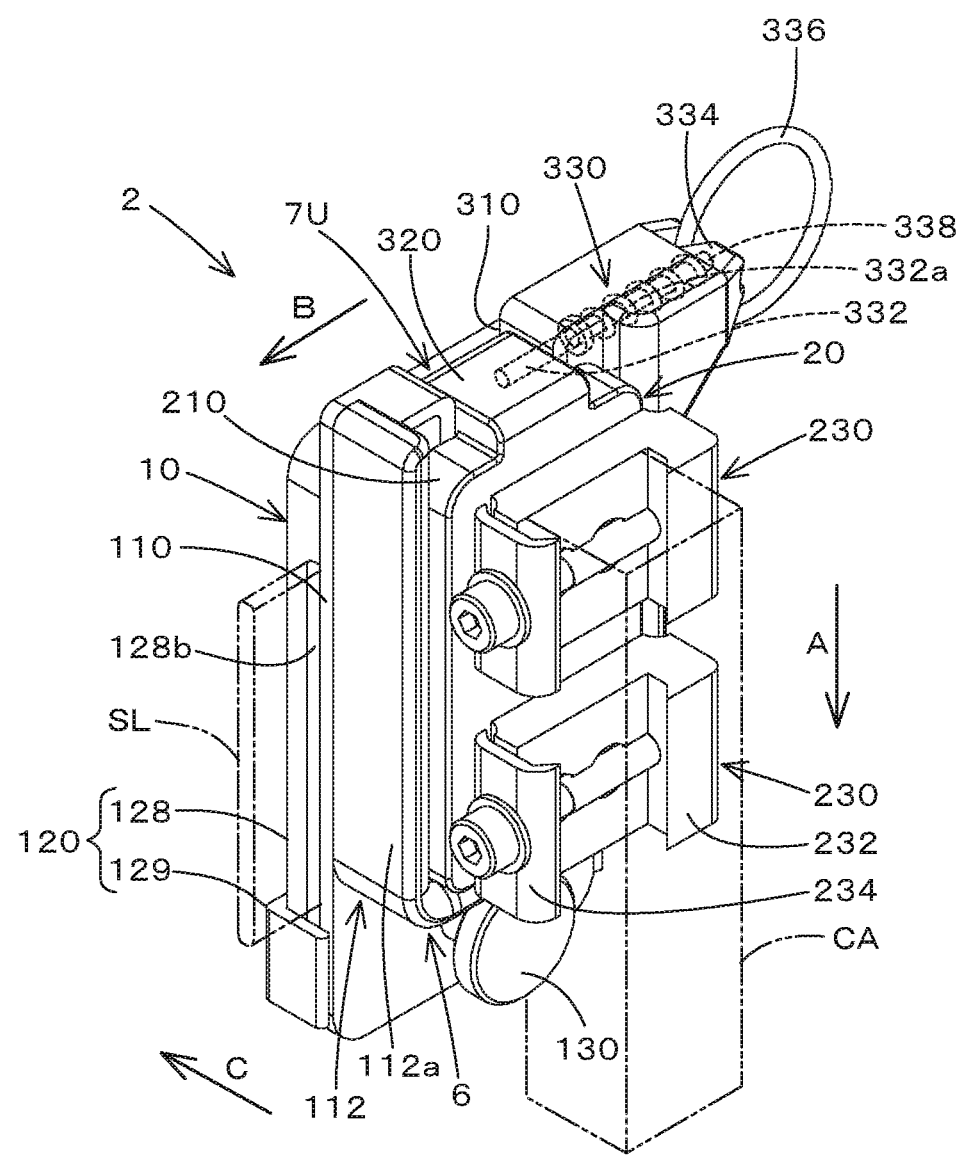
FIG. 7 is a perspective view of a coupler in a second embodiment of the present invention, in which a base and an attachment body are coupled together.

In FIG. 6, the hook part 320 of the attachment body 20 forms a tapered shape, the left and right side surfaces are tilt surfaces 324, or at least a side surface facing to the engaging pin 332 is a tilt surface 324 that becomes separated from the engaging pin 332 toward the fore end, and when inserting the hook part 320 into the opening part 310, the tilt surface 324 touches the engaging pin 332 having moved into the opening part 310 to press the engaging pin 332 while resisting the spring 338. The locking hole 322 of the hook part 320 faces to the engaging pin 332, and thereby the spring-back of the spring 338 causes the engaging pin 332 to move into the locking hole 322, so that a state where the hook part 320 engages with the locking part 311 is made inseparable (locked).

The attachment body 20 is a second coupling member serving as an attachment/detachment side of the coupler 1, and includes: an attachment main body 210 facing to the base 10; an attachment tool 230 for attaching the attaching target CA; and a holding member 270 holding the attachment tool 230 on the attachment main body 210.

Inside the attachment main body 210, the magnet 60 and back yoke 90 that are plate-shaped and to be attracted by and magnetically attached to the magnets 50 of the base 10 are arranged and covered with a lid plate 211, and the front surface of the lid plate 211 serves as a joint surface 20a to be joined to the base 10. The magnet 60 has a size covering the two magnets 50, and the lines of magnetic force lie in a thickness direction.

When the magnet 60 is formed of one large magnet, the surface magnetic pole thereof (a magnetic pole on the joint surface 20a side and for example, an N-pole) is set to a pole opposite to the surface magnetic poles of the two base magnets 50 (magnetic poles on the joint surface 10a side and for example, S-poles). The attachment body magnet 60 can be formed of two magnets, i.e., upper and lower magnets, as with the base magnets 50, and in that case, as the base magnets 50, N and S poles are arranged one above the other, whereas as the attachment body magnets 60, S and N poles are arranged one above the other.

The magnetic attachment position between the magnets 50 of the base 10 and the magnet 60 of the attachment body 20 is fixed, and at the time of magnetic attachment from a mutually shifted state, mutual attraction occurs so as to correct the shift, so that the base 10 and the attachment body 20 are coupled together in a position where the lines of magnetic forces are minimized. That is, the magnets 50 and 60 serve as the guiding mechanism 6 configured to guide the attachment body 20 to the magnetic attachment position.

When the attachment body 20 is magnetically attached to the base 10, the guiding mechanism 6 based on the magnets 50 and 60 also perform a guiding action for inserting the protrusion 212 into the through-hole 112c and inserting the hook part 320 into the opening part 310 to engage the hook part 320 with the locking part 311. The back yoke 90 shields the magnetism of the magnet 60 toward the attaching target CA side to suppress the magnetism from adversely affecting the camera or an electronic device.

The attachment main body 210 is formed with the protrusion 212 protruding downward (in the arrow A direction in FIGS. 1 to 3, 5, and 6) in the left-right direction center of the lower end, and configured to be restricted by the hole wall part 112d from moving in a direction to separate from the base 10 by inserting the protrusion 212 into the through-hole 112c of the base 10 from the upper side.

The attachment main body 210 is formed with the tapered hook part 320 protruding toward the back side (indicated as the arrow C direction in FIGS. 2, 3, and 5) in the left-right direction center of the upper part, the left and right side surfaces of the hook part 320 are the tilt surfaces 324, and by inserting the hook part 320 into the opening part 310 while bringing the hook part 320 close to the base 10 and further moving the hook part 320 downward inside the opening part 310, the hook part 320 engages with the locking part 311 protruding upward from the lower edge of the opening part 310. The hook part 320 engages with the locking part 311, and thereby the upper part of the attachment body 20 is restricted from separating and moving from the base 10 (the upper restricting mechanism 7U).

The attachment tool 230 includes a disc-shaped rotating operation part 231 and a male screw part 233 protruding from the central part of it. The male screw part 233 penetrates through the holding member 270 and protrudes toward the front surface side, is configured to be screwable into a screw hole formed in the back surface or lower surface of the attaching target (such as the camera) CA, and is configured to be able to attach the attaching target CA to the attachment body 20.

The holding member 270 has thick spacer parts 250 in the upper and lower parts of the back surface, is fixed to the front surface side of the attachment main body 210 by screws 294 at the positions of the upper and lower spacer parts 250, and between the upper and lower spacer parts 250, is formed with a space to arrange the rotating operation part 231 of the attachment tool 230. Note that in the holding member 270, the spacer parts 250 may be formed of a separated member.

The left-right width of the top-bottom central part of the holding member 270 is made narrower than the diameter of the rotating operation part 231 to cause the outer circumference of the rotating operation part 231 to be exposed, and this allows the rotating operation part 231 to be manually rotatable.

A method for using the coupler 1 will be described.

Figure 3:
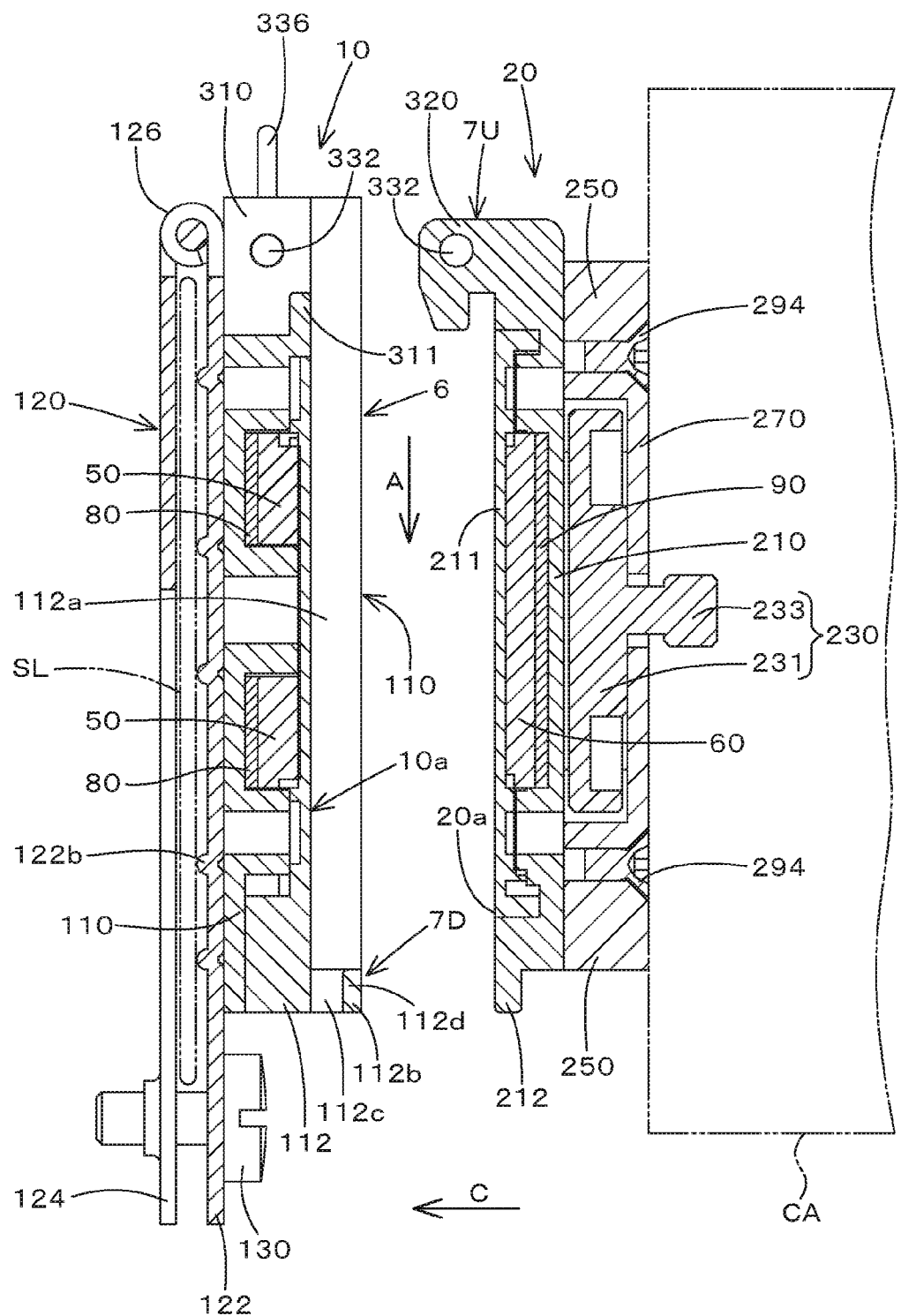
FIG. 3 is a cross-sectional view of a state where the base and the attachment body are separated.

In a state where the base 10 and the attachment body 20 are separated as illustrated in FIGS. 3, 5, and 6, the base 10 is attached to the attached target SL with the attached target SL sandwiched by the fixing member 120 of the base 10, and the attachment tool 230 of the attachment body 20 is attached to the attaching target CA.

The attachment body 20 attached with the attaching target CA is brought close to the base 10 from front and above, the protrusion 212 in the lower part of the attachment body 20 is slid downward while placing the protrusion 212 on the joint surface 10a of the base 10, and the upper part of the attachment body 20 is brought close to the joint surface 10a of the base 10. When doing this, the left and right side parts of the attachment body 20 respectively touch the side guide parts 112 of the base 10, and thereby the left-right direction is guided to position the joint surfaces 10a and 20a in proper positions in the left-right direction.

When moving the attachment body 20 downward (indicated as the arrow A direction in FIGS. 1 to 3, 5, and 6) in this state while further bringing the attachment body 20 close to the base 10, the protrusion (the engaged part) 212 in the lower part of the attachment body 20 is inserted into the through-hole (the engaging part) 112c of the base 10, the lower surface of the attachment body 20 touches the lower guide part 112b to thereby set a downward position, and simultaneously with this, the hook part (the engaged part) 320 of the attachment body 20 is inserted into the opening part 310 of the base 10 and engages with the locking part (the engaging part) 311.

In the process of bringing the attachment body 20 close to the base 10, the magnets 50 and 60 of the two attract each other to magnetically attach the attachment body 20 to the base 10, and simultaneously, the magnet 60 is guided to a position where the lines of magnetic force is minimized with respect to the magnets 50, so that both of the joint surfaces 10a and 20a are joined together and the attachment body 20 is coupled to the base 10 in a proper position.

In a coupled state as described above, the engagement between the protrusion 212 and the hole wall part 112d and the engagement between the hook part 320 and the locking part 311 respectively restrict the lower and upper parts of the attachment body 20 from moving in the direction to separate from the base 10, and the upper and lower restricting mechanisms 7D and 7U enter an acting state.

Also, the locking mechanism 330 is provided, so that when the hook part 320 of the attachment body 20 is about to be inserted into the opening part 310 of the base 10, the tilt surfaces 324 as the side surfaces of the hook part 320 engage with the locking part 311 while moving back the engaging pin 332 from the opening part 310, and at the time of the engagement with the locking part 311, the engaging pin 332 having moved back moves into the locking hole 322 formed in the tilt surfaces 324 of the hook part 320 to block the attachment body 20 from moving upward with respect to the base 10, thus allowing the locking mechanism 330 to enter an acting state.

When the locking mechanism 330 is prevented from acting, and when the attachment body 20 is detached from the base 10, the engaging pin 332 of the locking mechanism 330 is pulled using the operation part 336 and moved to an entering position not to engage with the hook part 320, and the operation part 336 is locked in the locking grooves 334a of the support parts 334.

When moving the attachment body 20 upward of the base 10 in the unlocked state of the locking mechanism 350, the protrusion 212 of the attachment body 20 is detached from the hole wall part 112d and the hook part 320 is detached from the locking part 311. When separating the upper part of the attachment body 20 from the base 10 in this state, an attractive force caused by the magnets 50 and 60 is also weakened, and the attaching target CA attached with the attachment body 20 can be separated from the attached target SL.

Second Embodiment

FIGS. 7 to 11 illustrate a second embodiment of the present invention, in which a coupler 2 is one that makes it possible to carry an attaching target CA not having a screw hole for attachment, such as a rifle, and as in the first embodiment, includes: a base 10 to be attached to an attached target SL; an attachment body 20 that is attached to the attaching target CA and to be detachably coupled to a joint surface 10a of the base 10, and a locking mechanism 330.

The base 10 includes: a main body 110; a guide member 112 that blocks a front surface side of the main body 110; and a fixing member 120 configured to attach the attaching target CA to a back surface of the main body 110, and the lower part of the main body 110 protrudes downward from the lower end of the guide member 112.

The fixing member 120 utilizes the back surface of the main body 110, and includes: a presser plate 128 of which the upper part is firmly fixed to the back surface of the main body 110 by screws 142; and a fastening member 129 that fixes the lower part of the presser plate 128 to the lower part of the main body 110. The presser plate 128 is formed in an inverted U-shape having a cutout part 128a, and formed with a slit 128 for inserting the attached target SL between itself and the back surface of the main body 110, whereas the fastening member 129 has a length overlapping the two leg parts of the presser plate 128, and in the center thereof, a screw hole 129a is formed.

In the lower part of the main body 110, an insertion hole 114 is bored, and by inserting a male screw part 130a of a fixing screw 130 into the insertion hole 114 and screwing the male screw part 130a into the screw hole 129a of the presser plate 128 while making a pressing part 130b of the fixing screw 130 touch the main body 110, the presser plate 128 can be fixed in a state of sandwiching the attaching target CA.

The main body 110 contains plate-shaped magnets 50 and plate-shaped back yoke 80. The two magnets 50 that are long in a top-bottom direction are parallel arranged left and right. The magnets 50 may be configured as one large plate-shaped magnet.

The main body 110 is formed with a lower guide part 112b in a lower part of the joint surface 10a, and the lower guide part 112b is formed with a through-hole 112c and a hole wall part 112d around the through-hole 112c, which constitute a lower restriction mechanism 7D together with a protrusion 212 in the lower part of the attachment body 20.

The guide member 112 is such that the front surface thereof is the joint surface 10a; the left and right side parts thereof are formed with a pair of side guide parts 112a; and the lower ends of the left and right side guide parts 112a are arranged so as to connect to both of the left and right ends of the lower guide part 112b formed on the main body 110.

When the attachment body 20 is joined (indicated by the arrow C direction in FIGS. 7, 8, and 10), the left and right side guide parts 112a are ones that guide a left-right direction position, and when the attachment body 20 is moved downward (indicated by the arrow A direction in FIGS. 7, 8, and 10) and joined, the lower guide part 112b is one that sets a lower position, thus constituting a guiding mechanism 6 configured to guide a magnetic attachment position of the attachment body 20 with respect to the base 10. The magnets 50 of the base 10 and magnets 60 of the attachment body 20 also constitute the guiding mechanism 6 configured to guide the attachment body 20 to a magnetic attachment position.

As in the first embodiment, the upper part of the main body 110 is formed with an opening part 310 and a locking part 311 protruding upward from the lower edge of the opening part 310 to constitute an upper restricting mechanism 7U together with a hook part 320 formed in the upper part of the attachment body 20, and inside the main body 110 on one of the left and right sides (right side) of the opening part 310, the locking mechanism 330 is provided.

The attachment body 20 includes an attachment main body 210 facing to the base 10 and an attachment tool 230 for attaching the attaching target CA. Inside the attachment main body 210, the magnets 60 and back yokes 90 that are plate-shaped and to be attracted by and magnetically attached to the magnets 50 of the base 10 are arranged and covered with a lid plate 211, and the front surface of the lid plate 211 is a joint surface 20a to be joined to the base 10. The magnets 60 are such that the surface areas are smaller than those of the two magnets 50; the top-bottom direction centers deviate upward; the lines of magnetic forces lie in the thickness direction, and the surface magnetic poles of them are opposite to the surface magnetic poles of the two magnets 50, respectively.

Given that the surface magnetic poles of the two (left and right) magnets 50 are N and S, and the surface magnetic poles of the two (left and right) magnets 60 are S and N, when bringing the two magnets 60 close to the two magnets 50, both are accurately magnetically attached to each other in exactly opposite positions because an attractive force acts between mutually opposite poles, and a repulsive force acts between the same poles.

The attachment tool 230 includes: a pair of upper and lower fixed claws 232 screwed to the attachment main body 210; movable claws 234 capable of proceeding to or recede from the respective fixed claws 232; and bolts 236 that makes the movable claws 234 proceed to or recede from the fixed claws 232, respectively and correspondingly.

The fixed claws 232 and the movable claws 234 have a claw shape on the front surface side, and both constitute clamps configured to detachably sandwich parts of the attaching target CA such as a rifle.

The attachment main body 210 is such that the protrusion 212 protruding downward is formed at the lower end and the tapered hook part 320 that protrudes toward the back side is formed in the left-right direction center of the upper part.

The coupler 2 enters a regular coupling state in such a way that the attraction between the magnets 50 and the magnets 60 allows the protrusion 212 of the attachment main body 210 to engage with the hole wall part 112d on the front surface side of the through-hole 112c of the base 10, the hook part 32 of the attachment main body 210 to enter the opening part 310 of the base 10 and engage with the locking part 311, and the base 10 and the attachment body 20 to be joined together.

Figure 8:
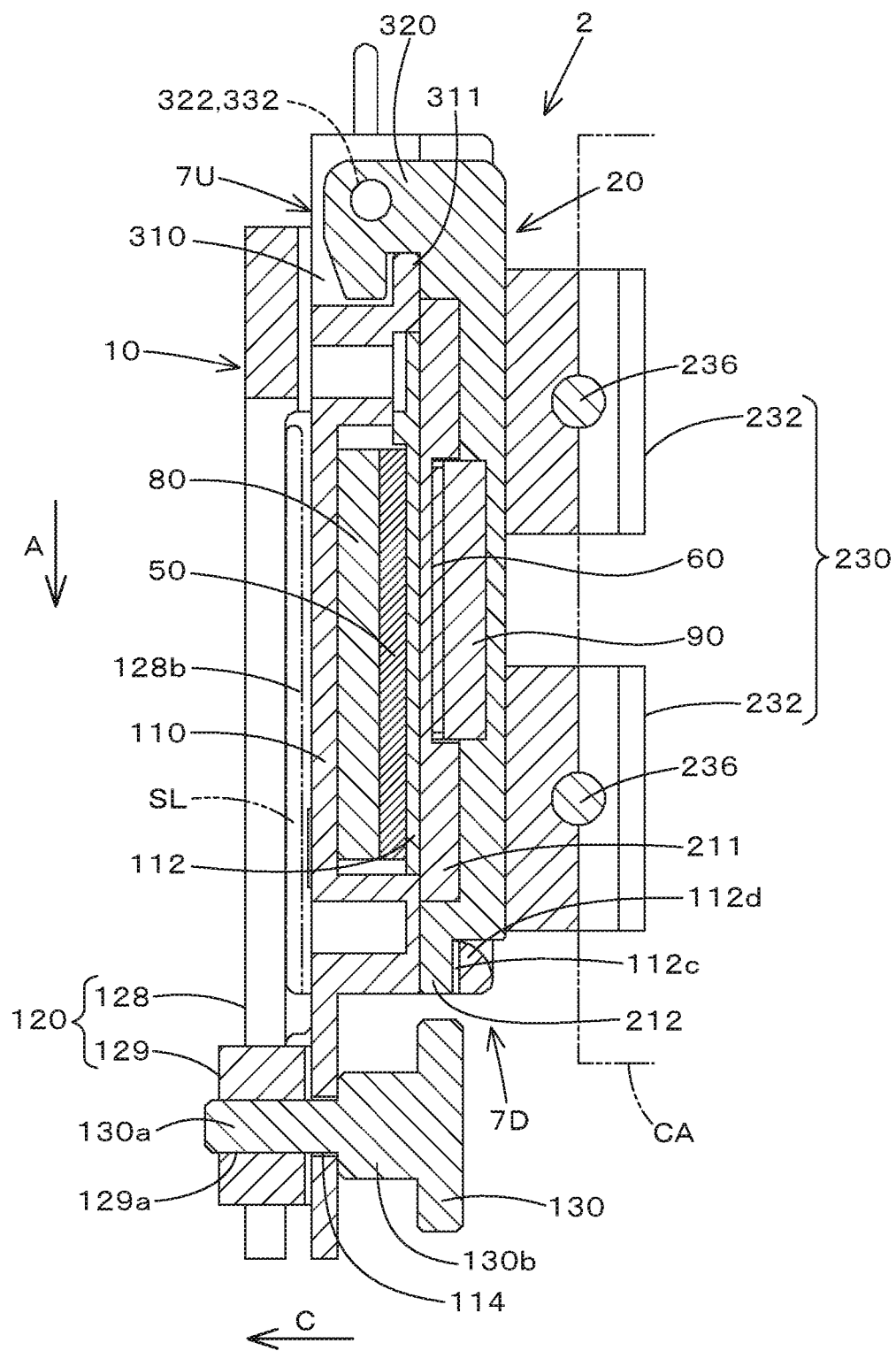
FIG. 8 is a vertical cross-sectional view of the coupler in FIG. 7.
Figure 9:
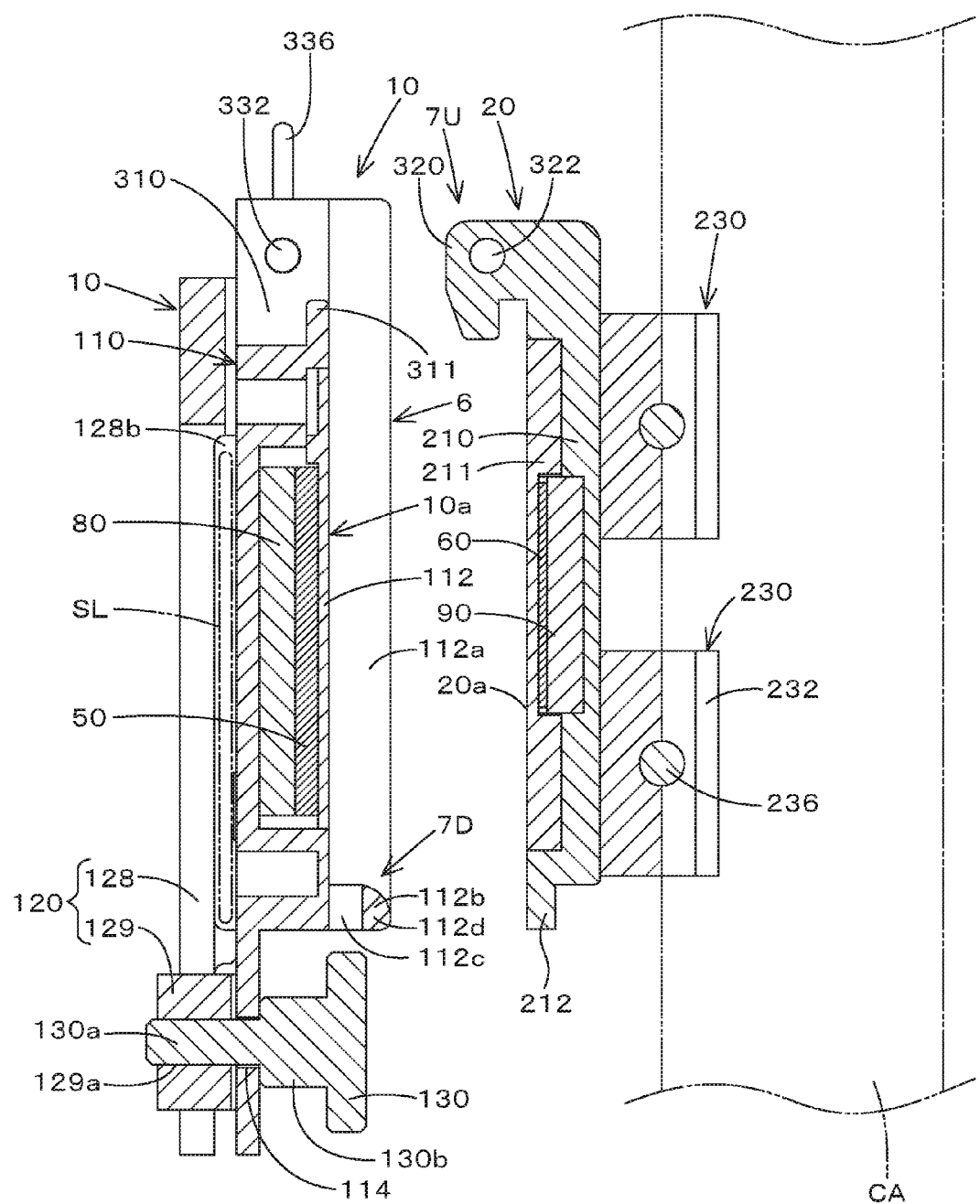
FIG. 9 is a cross-sectional view of a state where the base and the attachment body are separated.
Figure 10:
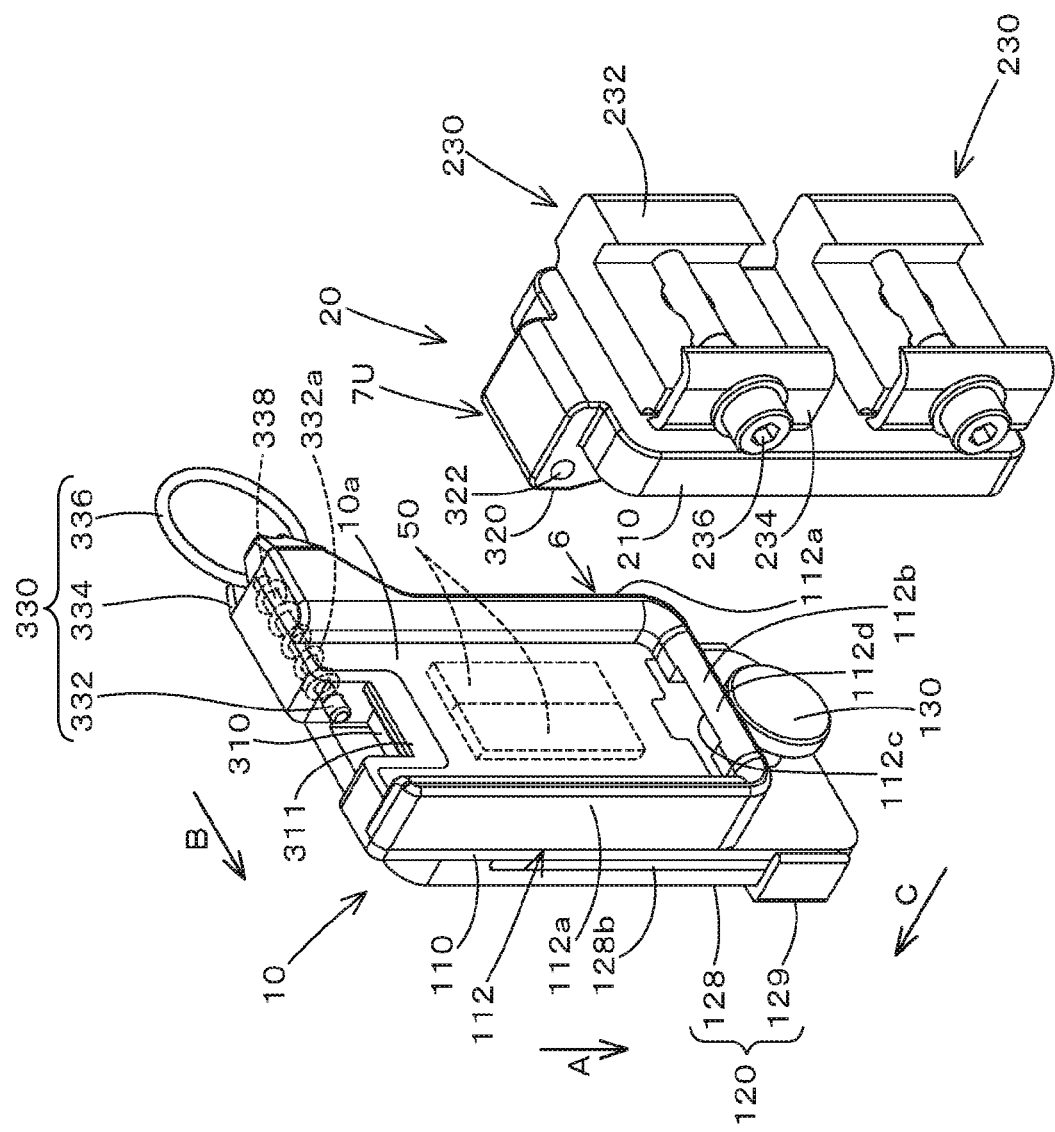
FIG. 10 is a front side perspective view of the state where the base and the attachment body are separated.
Figure 11:
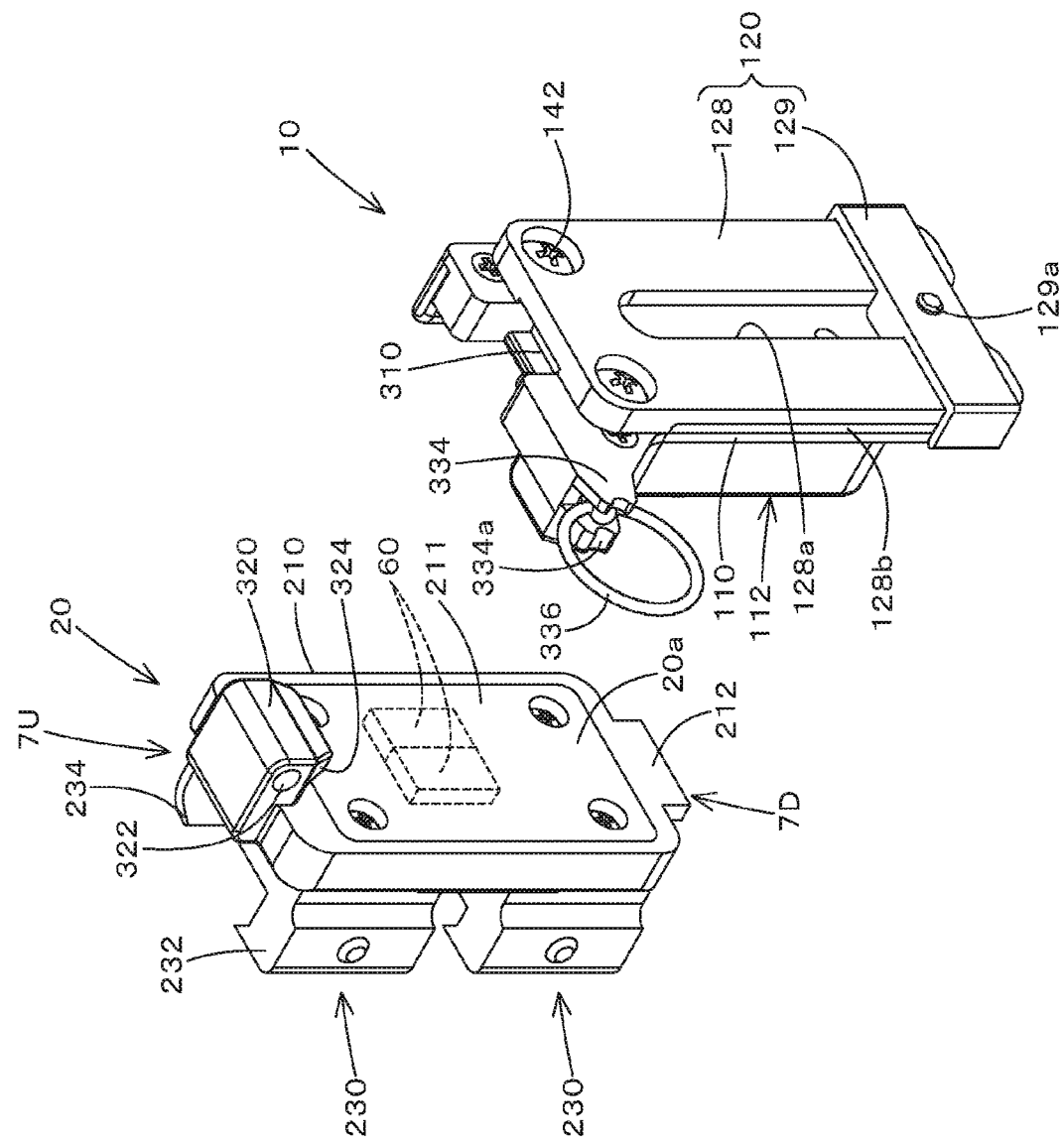
FIG. 11 is a back side perspective view of the state where the base and the attachment body are separated.
Figure 12:
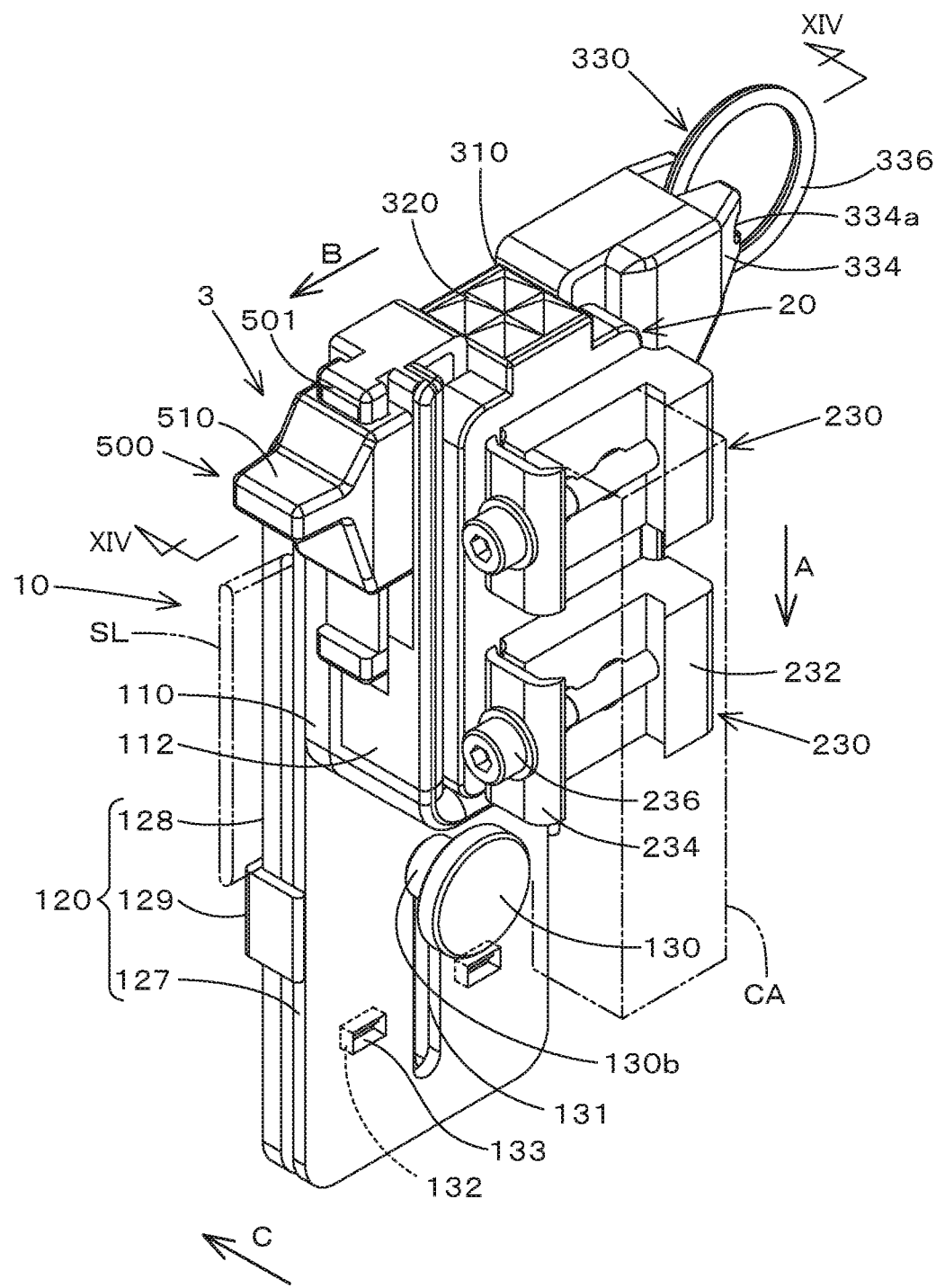
FIG. 12 is a perspective view of a coupler in a third embodiment of the present invention, in which a base and an attachment body are coupled together.
Figure 13:
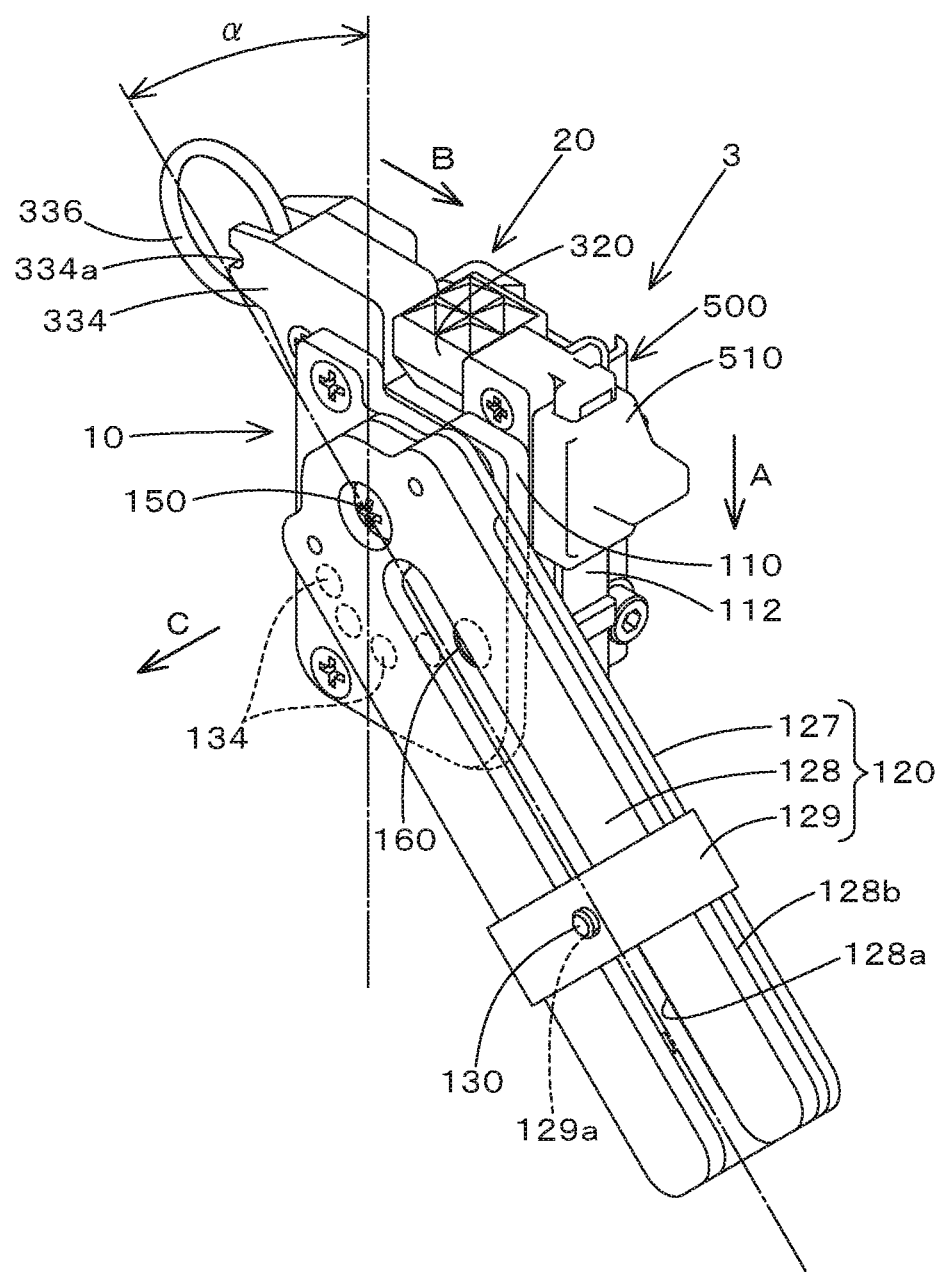
FIG. 13 is a back side perspective view of the coupler in FIG. 12.

The magnets 50 of the base 10 and the magnets 60 of the attachment body 20 are such that as illustrated in FIG. 8, the centers of the magnets 60 deviate upward from the centers of the magnets 50, respectively and correspondingly, and when the magnets 50 and the magnets 60 attract each other, the attraction acts so as to minimize the lines of magnetic forces of them, so that the attachment body 20 is attracted downward, thus making it possible to suppress the attachment body 20 from stopping before the hole wall part 112d and also to bias the attachment body 20 to a position where the protrusion 212 is inserted into the through-hole 112c and touches the hold wall part 112d.

Third Embodiment

FIGS. 12 to 15 illustrate a third embodiment of the present invention, in which a coupler 3 is one that makes it possible to carry an attaching target CA not having a female screw for attachment, such as a rifle, with an attachment angle changeable, and as in the second embodiment, includes: a base 10 to be attached to an attached target SL; an attachment body 20 that is attached to the attaching target CA and to be detachably coupled to a joint surface 10a of the base 10; and a locking mechanism 330.

The base 10 includes s: a main body 110; a guide member 112 that blocks a front surface side of the main body 110; and a fixing member 120 configured to attach the attaching target CA to a back surface of the main body 110, and the main body 110 and the guide member 112 have substantially the same size in a top-bottom direction.

The fixing member 120 includes: a backing plate 127 fixed to the back surface of the main body 110; a presser plate 128 of which the upper part is firmly fixed to the back surface of the backing plate 127 by screws; and a fastening member 129 configured to fix the lower part of the presser plate 128 to the lower part of the backing plate 127.

The backing plate 127 and the presser plate 128 are formed to have a length largely protruding downward from the base 10, and both are screw-coupled at the upper parts and attached to the base 10 so as to be able to change an angle around an upper screw 150.

The presser plate 128 is formed in an inverted U-shape having a cutout part 128a, and formed with a slit 128b for inserting the attached target SL between itself and the back surface of the main body 110, whereas the fastening member 129 has a length overlapping the two leg parts of the presser plate 128, and in the center thereof, a screw hole 129a is formed.

The backing plate 127 is formed with a top-bottom direction long hole 131 in the lower part, and by inserting a male screw part 130a of a fixing screw 130 into the long hole 131 and screwing the male screw part 130a into the screw hole 129a of the presser plate 128 while making a pressing part 130b of the fixing screw 130 touch the backing plate 127, the presser plate 128 can be fixed to the backing plate 127 in a state of sandwiching the attaching target CA. The fixing screw 130 and the fastening member 129 can be adjusted in top-bottom position within a range of the length of the long hole 131, and sandwich the attaching target CA having wide width.

The lower part of the presser plate 128 is formed with a pair of left and right positioning protrusions 132, whereas the backing plate 127 is formed with engaging holes 133 so as to face to the protrusions 132, and the protrusions 132 engage with the engaging holes 133, respectively and correspondingly, to thereby enable the positioning between the backing plate 127 and the presser plate 128 at the time of sandwiching.

The backing plate 127 is attached to the base 10 by a fixing screw 160 at a position separated from the upper screw 150. On the back surface of the base 10, multiple female screw holes 134 are arrayed in an arc shape around the upper screw 150.

The fixing screw 160 is inserted from the cutout part 128a of the presser plate 128, penetrates through the backing plate 127, and is screwed into any of the female screw holes 134. The female screw holes 134 are formed at a position on the left-right direction centerline of the base 10, which passes through the upper screw 150, and at positions tilted left and right from the centerline at angles α (illustrated in FIG. 13), for example, at positions tilted left and right at angles of 22.5° and 45°, and the angle of the fixing member 120 is made changeable with respect to the base 10, i.e., the angle of the base 10 is made changeable with respect to the fixing member 120 fixed to the attached target SL, thus making the carrying posture of the attaching target CA changeable.

The upper part of the base 10 is provided with a second locking mechanism 500 also using an engaging pin 332 of the locking mechanism 330. The second locking mechanism 500 can perform a locking/unlocking operation even by itself, but is used to support unlocking the first locking mechanism 330.

Figure 14:
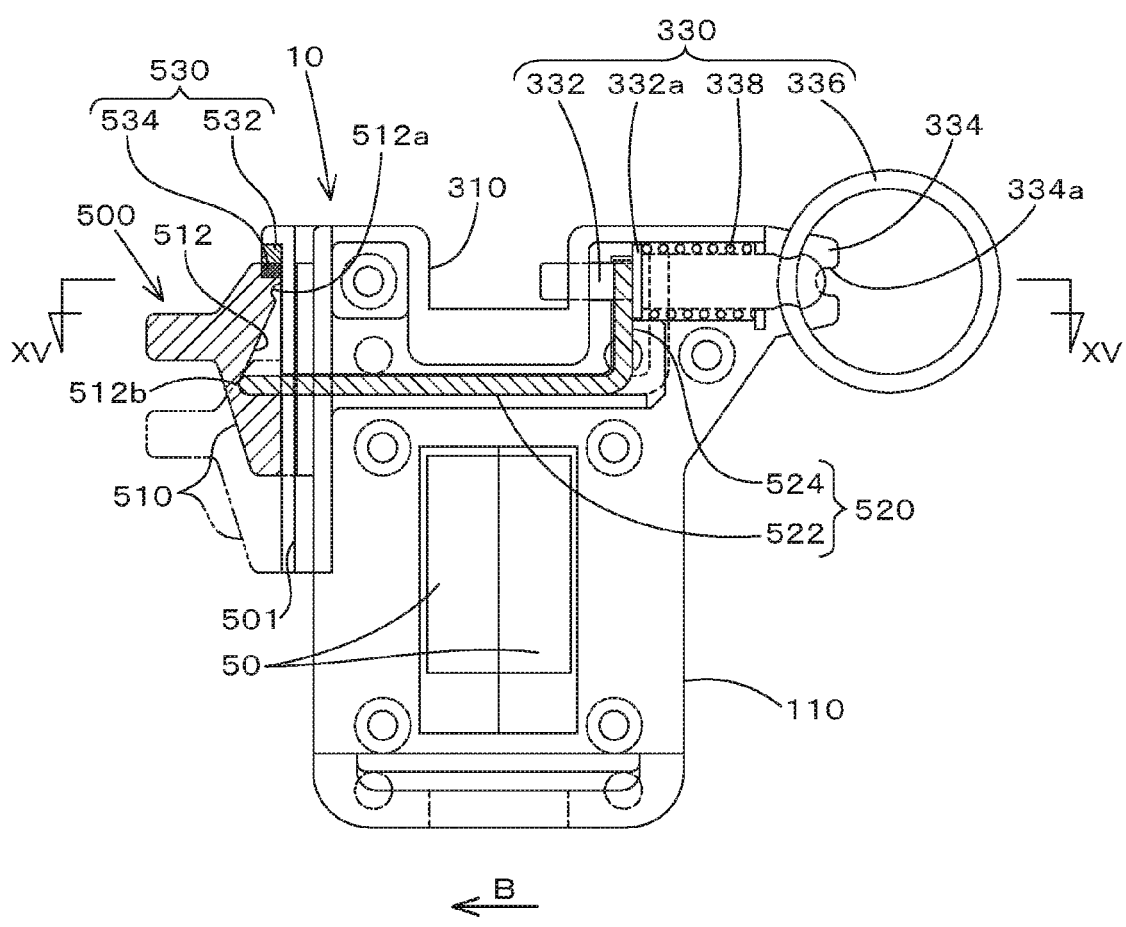
FIG. 14 is a cross-sectional view along an XIV-XIV line in FIG. 12.
Figure 15:
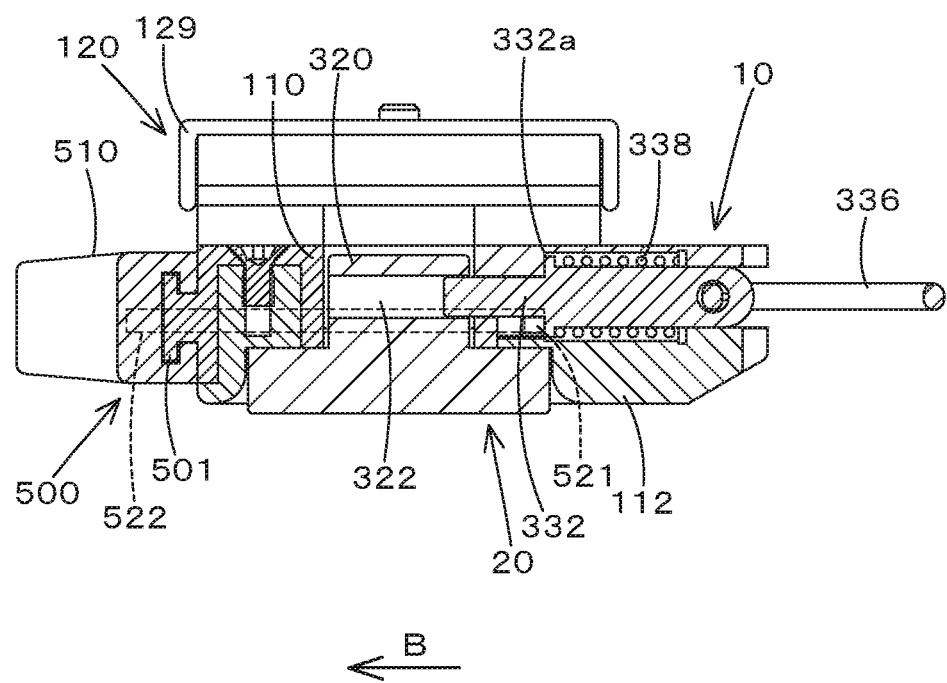
FIG. 15 is a cross-sectional view along an XV-XV line in FIG. 14.
Figure 16:
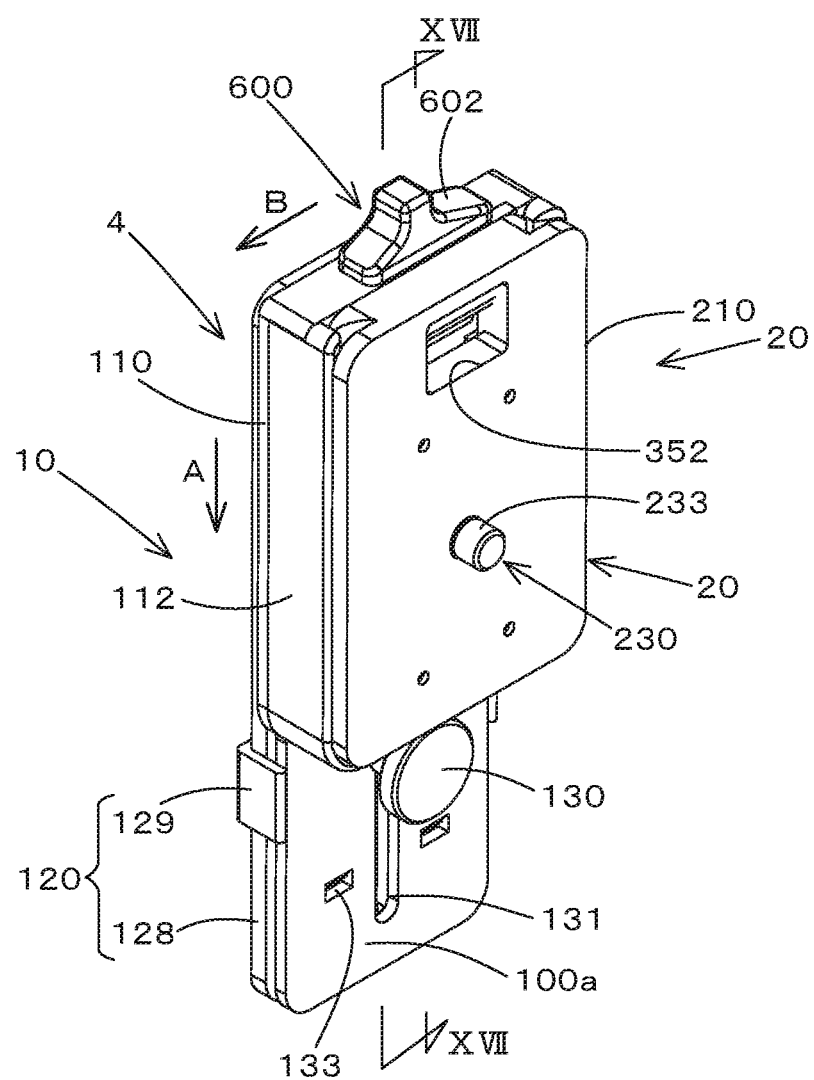
FIG. 16 is a perspective view of a coupler in a fourth embodiment of the present invention, in which a base and an attachment body are coupled together.
Figure 17:
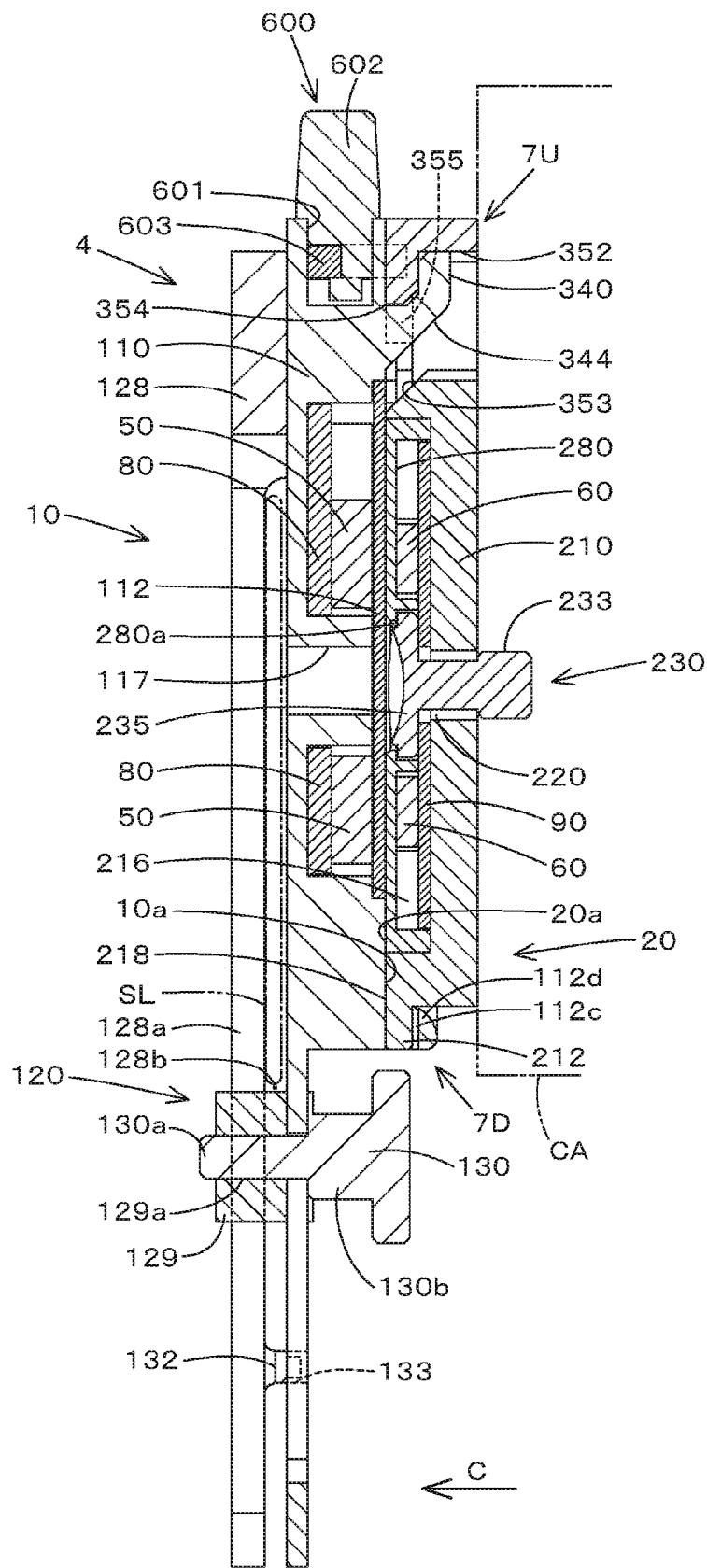
FIG. 17 is a cross-sectional view along an XVII-XVII line in FIG. 16.
Figure 18:
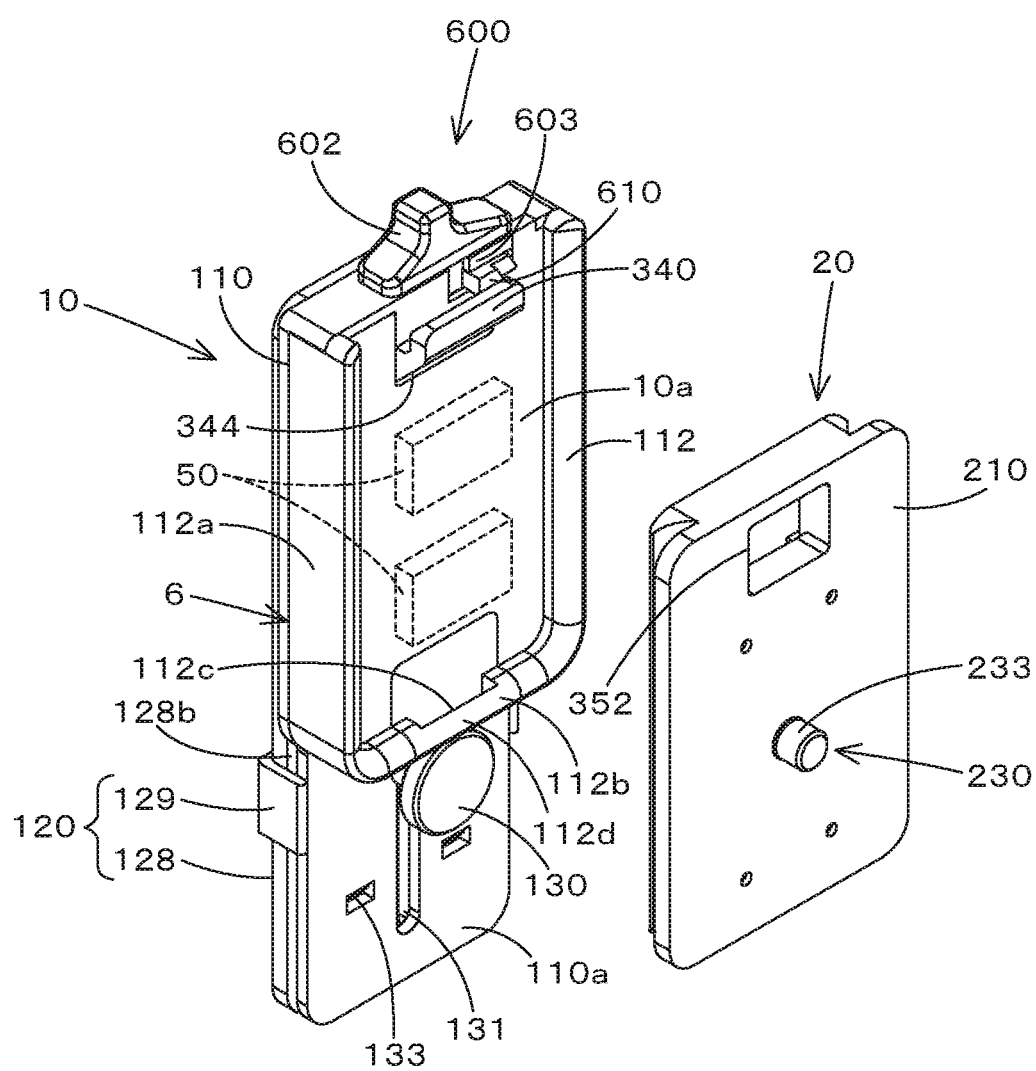
FIG. 18 is a front side perspective view of a state where the base and the attachment body are separated.
Figure 19:
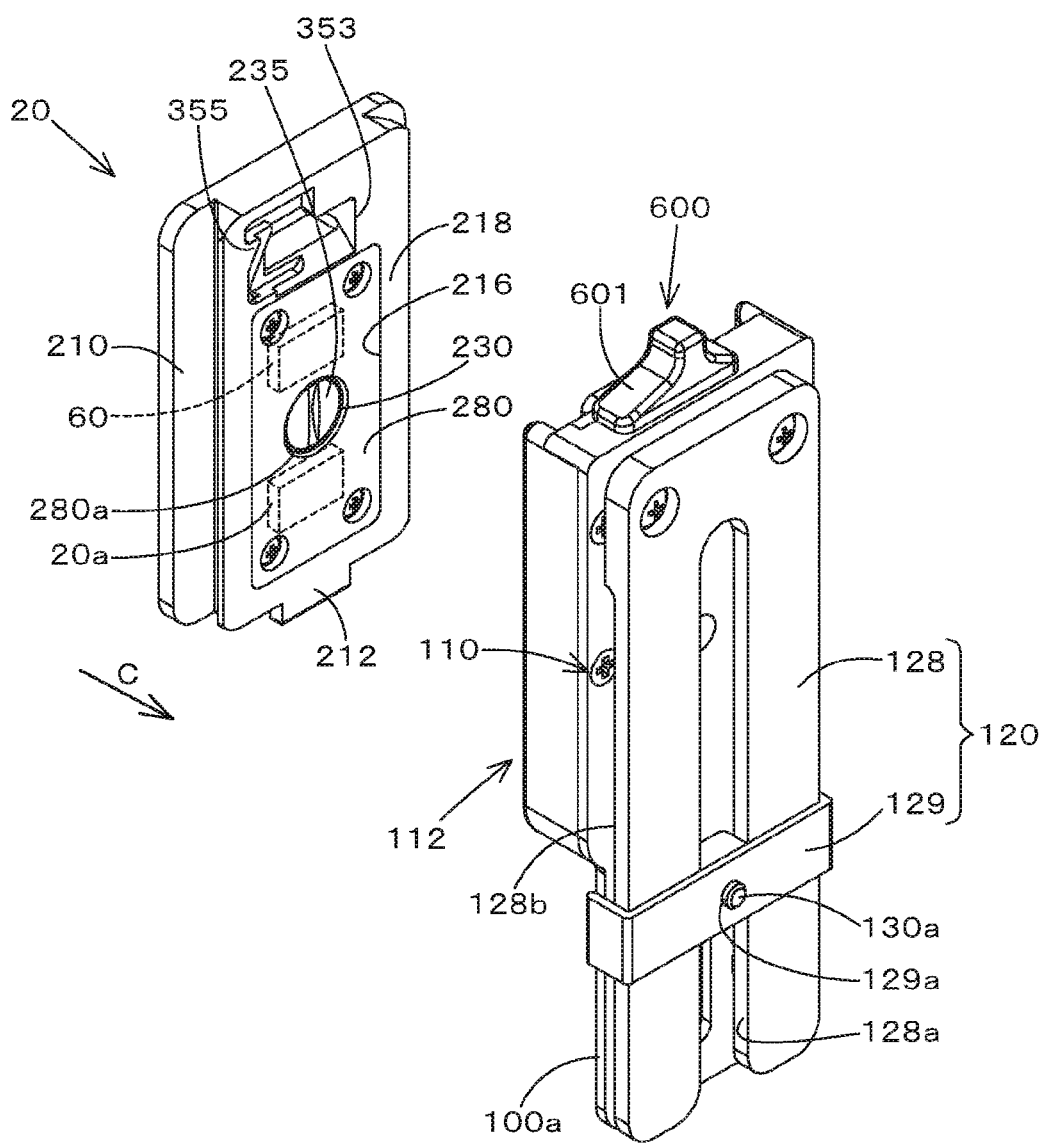
FIG. 19 is a back side perspective view of the state where the base and the attachment body are separated.
Figure 20:
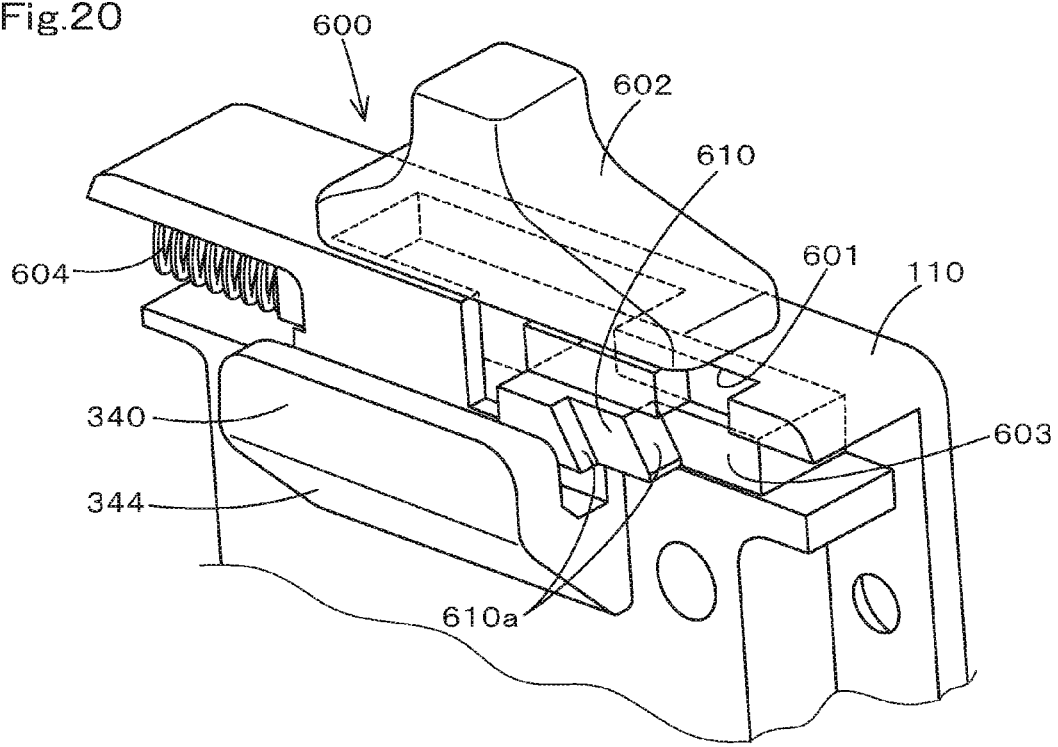
FIG. 20 is a front side perspective view of a locking mechanism.
Figure 21:
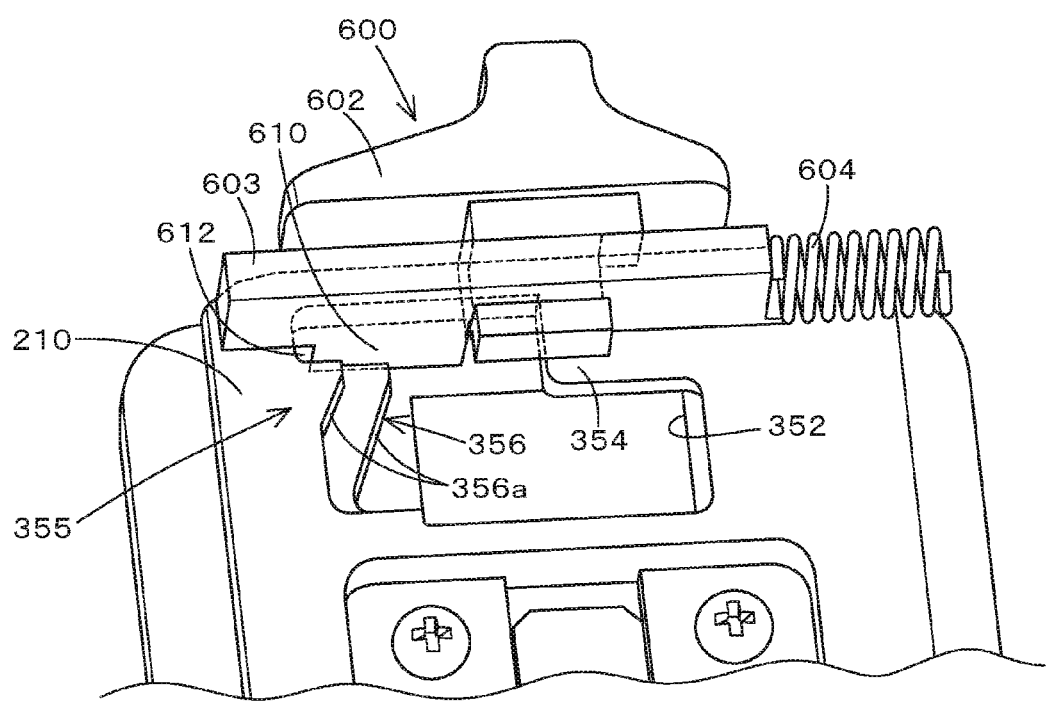
FIG. 21 is a back side perspective view of the locking mechanism.

In FIGS. 14 and 15, a side guide part 501 is formed on a side surface of the main body 110 (on the side opposite to the arrangement side of the locking mechanism 330), and engaged with an operation knob 510 slidably up and down, and between the operation knob 510 and the engaging pin 332 of the first locking mechanism 330, an L-shaped interlocking member 520 is provided.

One side of the interlocking member 520 is a vertical part 524, engages with the engaging pin 332 on a side closer to the fore end than a flange part 332a that is an intermediate part of the engaging pin 332, and can be pressed by the protruding action of the engaging pin 332, whereas the other side is a horizontal part 522 positioned below an opening part 310, and the fore end thereof is extended to the inside of the operation knob 510.

On the side facing to the side guide part 501, the operation knob 510 forms an inclined cam surface 512 that gets closer to the main body 110 from the lower part toward the upper part, and the upper end of the inclined cam surface 512 is formed with an upper end concave part 512a, whereas the lower end is formed with a lower end concave part 512b. The fore end of the horizontal part 522 of the interlocking member 520 slidably touches the inclined cam surface 512, and is configured to be engageable with the upper end concave part 512a and with the lower end concave part 512b.

The upper part of the operation knob 510 and the upper part of the side guide part 501 are provided with holding means 530 for holding the operation knob 510 at an upper inoperable position. The holding means 530 includes: a magnet 532 attached to the main body 110; and an attractive plate 534 attached to the side guide part 501.

In FIGS. 14 and 15, when the first locking mechanism 330 is in a locking action state, in the second locking mechanism 500, the operation knob 510 is positioned at the upper part of the side guide part 501 by the holding means 530, by pulling an operation part 336 in this state, the engaging pin 332 can be moved back from a hook part 320, and at this time, the interlocking member 520 is set free, whereas the operation knob 510 is kept unmovable by the holding means 530.

When sliding the operation knob 510 toward the lower part of the side guide part 510 while resisting the holding means 530 in the locking action state, the position of the inclined cam surface 512 touched by the fore end of the horizontal part 522 of the interlocking member 520 changes from a position far from to a position near to the side guide part 501, and therefore the horizontal part 522 of the interlocking member 520 is pressed by the inclined cam surface 512 to make the vertical part 524 move back the engaging pin 332, thus entering an unlocked state.

When engaging the upper end concave part 512a on the upper side of the inclined cam surface 512 with the fore end of the horizontal part 522 in a state where the vertical part 524 moves back the engaging pin 332, the operation knob 510 cannot be moved upward with small force because the upper end concave part 512a serves as resistance to movement, and the interlocking member 520 can be kept at an unlocked position, thus enabling an unlocking keeping state (indicated by a virtual line in FIG. 14) that is the same as a state where the operation part 336 of the first locking mechanism 330 is locked in locking grooves 334a of support parts 334.

When moving the operation knob 510 upward with great force in the unlocking keeping state while resisting the resistance to movement caused by the upper end concave part 512a, the second locking mechanism 500 enters the locking action state.

The operation knob 510 of the second locking mechanism 500 is arranged on the side opposite in left-right to the operation part 336 of the first locking mechanism 330, sandwiching the base 10, and even in a situation where it is difficult to use the left hand for operating the operation part 336 (e.g., even when the left hand is injured), by operating the operation knob 510 with the right hand, the locking mechanism 330 can be locked/unlocked with a single touch. Accordingly, when the attaching target CA is a rifle, it can be detached from the attached target (sling) SL to get ready for battle.

Note that by omitting the operation part 336, the second locking mechanism 500 becomes a single locking mechanism without including the first locking mechanism 330.

Fourth Embodiment

FIGS. 16 to 21 illustrate a fourth embodiment of the present invention, in which a coupler 4 is one that makes it possible to carry an attaching target CA having a female screw for attachment, such as a camera, and includes: a base 10 to be attached to an attached target SL; an attachment body 20 that is attached to the attaching target CA and to be detachably coupled to a joint surface 10a of the base 10; and a locking mechanism 600.

The base 10 includes a main body 110, guide member 112, and fixing member 120, and the lower part 110a of the main body 110 largely protrudes downward from the lower end of the guide member 112.

The fixing member 120 utilizes the back surface of the main body 110, and includes: a presser plate 128 of which the upper part is firmly fixed to the back surface of the main body 110; and a fastening member 129 configured to fix the lower part of the presser plate 128 to the lower part 110a of the main body 110.

The presser plate 128 has a cutout part 128a, and is formed with a slit 128 for inserting the attached target SL between itself and the back surface of the main body 110, whereas the fastening member 129 is formed in the center with a screw hole 129a.

By inserting a male screw part 130a of a fixing screw 130 into a long hole 131 in the lower part 110a of the main body 110 and screwing the male screw part 130a into the screw hole 129a of the presser plate 128 while making a pressing part 130b of the fixing screw 130 touch the lower part 110a of the main body 110, the main body 110 can be fixed to the attached target SL. The fixing screw 130 and the fastening member 129 can be adjusted in top-bottom position within a range of the length of the long hole 131, and can sandwich the attaching target CA having wide width.

By engaging a positioning protrusion 132 in the lower part of the presser plate 128 with an engaging hole 133 in the lower part 110a of the main body 110, the positioning between the main body 110 and the presser plate 128 can be performed at the time of sandwiching.

The main body 110 has a female screw hole 117 for tripod attachment in substantially the center of a magnet 50 containing part, and around the female screw hole 117, two (upper and lower) plate-shaped magnets 50 and plate-shaped back yokes 80 are contained. The two magnets 50 are magnetized such that the lines of magnetic forces lie in a front-back direction, and the surface magnetic pole of one is an N-pole, whereas the surface magnetic pole of the other is an S-pole.

As in the second embodiment, the main body 110 is formed with a lower guide part 112b in the lower part of the magnet 50 containing part, and the lower guide part 112b is formed with a through-hole 112c and a hole wall part 112d (an engaging part), which constitute a lower restricting mechanism 7D together with a protrusion 212 (an engaged part) of the attachment body 20.

The guide member 112 is such that a pair of left and right side guide parts 112a is formed and arranged so as to connect to both of the left and right ends of the lower guide part 112b formed on the main body 110, and when the attachment body 20 is joined (in the arrow C direction), guides a left-right direction position. When the attachment body 20 is moved downward (in the arrow A direction) and joined, the lower guide part 112b sets a lower position. These parts constitute a guiding mechanism 6 configured to guide the magnetic attachment position of the attachment body 20 with respect to the base 10.

Differently from the above-described first, second, and third embodiments, the upper part of the main body 110 is formed with an upward hook part 340 (an engaging part) in place of the opening part, whereas the attachment body 20 is formed with: an opening part 352 into which the hook part 340 can protrude; and a locking part 354 (an engaged part) protruding downward from the upper edge of the opening part 352, and in the upper part of the base 10, an upper restricting mechanism 7U and the locking mechanism 600 configured to disable the upper restricting mechanism 7U from being unlocked are provided.

The attachment body 20 includes: an attachment main body 210; two (upper and lower) magnets 60 and back yokes 90; an attachment tool 230 for attaching the attaching target CA; and a holding plate 280 that holds the attachment tool 230 and the two (upper and lower) magnets 60 and back yokes 90 in the attachment main body 210.

Inside the attachment main body 210, the two (upper and lower) magnets 60 and back yokes 90 are arranged, which are covered with the holding plate 280, and the front surface of the holding plate 280 is a joint surface 20a to be joined to the base 10. The back surface of the attachment main body 210 is flush with the joint surface 20a, and the entire back surface of the attachment body 20 is a flat surface.

The two (upper and lower) magnets 60 are such that the surface magnetic pole of one is an N-pole and the surface magnetic pole of the other is an S-pole, which are opposite to the surface magnetic poles of the two magnets 50 of the base 10 (magnetic poles on the joint surface 10a side). Accordingly, the attachment body 20 is magnetically attached to the base 10 only in a top-bottom proper posture, and erroneous attachment is prevented.

The attachment tool 230 includes a screw-head-shaped rotating operation part 235 and a male screw part 233 and is configured to be able to attach the attaching target CA to the attachment body 20 because the rotating operation part 235 is made rotationally operable by being engaged with a driver such as a coin through an opening hole 280a formed in the holding plate 280, and the male screw part 233 penetrates through the attachment main body 210 to protrude toward the front surface side, and is configured to be screwable into a screw hole of the attaching target CA.

The attachment main body 210 is restricted by the hole wall part 112d from moving in a direction to separate from the base 10 (the lower restricting mechanism 7D) with the protrusion 212 at the lower end inserted into the through-hole 112c of the base 10 from above.

In the attachment main body 210, an opening part 352 penetrating from the front to the back is formed in the left-right direction center of the upper part; a locking part 354 protruding downward from the upper edge of the opening part 352 and a lock part 355 protruding toward one side from a side edge of the opening part 352 are formed; and at the lower edge of the opening part 352, a chamfered surface 353 for facilitating the insertion of the hook part 340 is formed, thus constituting the upper restricting mechanism 7U together with the hook part 340 formed in the upper part of the base 10. On the lower surface side of the hook part 3340 as well, a tilt surface 344 for facilitating the insertion is formed.

Also, when the attachment body 20 is magnetically attached to the base 10, the guiding mechanism 6 based on the magnets 50 and 60 also performs a guiding action for inserting the protrusion 212 into the through-hole 112c and inserting the hook part 340 into the opening part 352 to engage the hook part 340 with the locking part 354.

In FIGS. 17 to 21, the locking mechanism 600 provided in the upper part of the main body 110 includes: a guide groove 601 formed in the upper part of the main body 110; an operation knob 602 and operation body 603 that can be guided along the guide groove 601 and moved left and right; a spring 604 that elastically presses the operation body 603; and the lock part 355 of the opening part 352 of the attachment main body 210.

The operation body 603 is integrally movable engaged with the operation knob 602; the operation body 603 is formed with a stepped protrusion 610 protruding toward the joint surface 10a side; the fore end of the stepped protrusion 610 faces to the right end of the hook part 340; and right end surfaces are formed as upward and outward inclined touch surfaces 610a.

The attachment main body 210 is formed with a cutout groove 612 between the upper edge of the opening part 352 and the lock part 355, and the cutout groove 612 is configured to be insertable with the stepped protrusion 610 when the hook part 340 moves into the opening part 352.

The lock part 355 is formed with a stepped concave part 356 that is concave in the direction of the thickness of the attachment main body 210 from the joint surface 20a side, and the surfaces of the stepped concave part 356 on the opening part 352 side are formed as inclined reception surfaces 356a that get closer to the center side of the attachment main body 210 from the bottom toward the top.

When the opening part 352 is fitted with the hook part 340, the stepped concave part 356 of the lock part 355 can engage with the stepped protrusion 610 of the operation body 603, and when they move while engaging with each other such that the joint surfaces 10a and 20a are joined together, the inclined touch surfaces 610a of the stepped protrusion 610 and the inclined reception surfaces 356a of the stepped concave part 356 touch each other, so that the operation body 603 is pressed while resisting the spring 604 and the stepped protrusion 610 moves into the cutout groove 612.

When the stepped protrusion 610 moves into the cutout groove 612, the stepped protrusion 610 touches the upper edge of the lock part 355 to block the relative up and down movement between the base 10 and the attachment body 20, and the engagement between the hook part 340 an the locking part 354 cannot be unlocked, thus entering a locking action state.

In the coupler 4 of the fourth embodiment, the back surface of the attachment body 20 is a flat surface not having any protruding part such as a hook part, and therefore when the attachment body 20 attached with the attaching target CA such as a camera is detached from the base 10, and placed on a desk with the joint surface 20a facing downward, the camera can be stably placed without being tilted.

Note that in the present invention, it is best to configure the shapes of the respective members in the above-described embodiments, and the front-back, left-right, and top-bottom positional relationships between or among them as illustrated in FIGS. 1 to 21. However, without limitation to the above-described embodiments, it is also possible to variously modify the members and configurations and change combinations.

For example, it is also possible to provide a permanent magnet in any one of the base 10 and the attachment body 20 and provide an attractive plate in the other one, or provide one plate-shaped magnet or multiple small-shaped magnets in each of the base 10 and the attachment body 20.

Also, the attached target SL and the attaching target CA may be the roof and roof rack or roof box of a car, a vehicle component and a pannier case, smartphone, or car navigation, or a working vest and a tool or a wireless device, or another combination.

Further, it is also possible to attach the attaching target CA to the base 10 and attach the attachment body 20 to the attached target SL, and it is also possible to provide the locking mechanism 330 on the attachment body 20 side.

It may be possible to configure the guiding mechanism 6 using only the magnetic forces of the magnets 50 and 60 and omit the guide member 112, and it may be possible to omit any one of the upper and lower restricting mechanism 7D and 7U. When the upper restricting mechanism 7U is omitted, the locking mechanism 330 can be configured by removing the locking part 311 and in place of the hook part 320, forming a protrusion to be inserted into the opening part 310.

Further, the lower restricting mechanism 7D may be configured by providing an upward protrusion below the joint surface 10a of the base 10, and below the joint surface 20a of the attachment body 20, providing a hole and hole wall part to disengageably engage with the protrusion from above.

Also, as the back yokes 80 for the magnets 50 of the base 10, and the back yokes 90 for the magnets 60 of the attachment body 20, for example, pairs of yokes arranged so as to respectively sandwich the magnets in a direction parallel to attractive surfaces, cross-sectionally U-shaped yokes that face to the attractive surfaces and the surfaces on the opposite sides and are formed so as to sandwich the magnets in the direction parallel to the attractive surfaces, respectively, or the like can be used, or any ones may be applied.

REFERENCE SIGNS LIST 1, 2, 3, 4 Coupler
6 Guiding mechanism
7 Restricting mechanism
10 Base
10a Joint surface
12 Fixing member
20 Attachment body
20a Joint surface
50, 60 Magnet
80, 90 Back yoke 110 Main body
120 Fixing member
210 Attachment main body
230 Attachment tool

The invention claimed is:

1. A coupler comprising:
a base to be fixed to an attached target; and
an attachment body that is fixed to an attaching target and to be detachably joined to the base, wherein:
the base includes a joint surface to be joined to the attachment body, a magnet configured to magnetically attach the attachment body to the joint surface, and an engaging part configured to engage with the attachment body,
the attachment body includes a joint surface to be joined to the base, a magnet configured to magnetically attach the magnet of the base to the joint surface, and an engaged part configured to disengageably engage with the engaging part of the base and restrict separation from the base by moving in a top-bottom direction,
a back surface of the base includes a fixing member to be detachably fixed to the attached target by sandwiching the attached target, the back surface being on a side opposite to the joint surface of the base, and a front surface of the attachment body includes an attachment tool that is capable of being operated for attachment from outside the attachment body and detachably attached to the attaching target, the front surface being on a side opposite to the joint surface of the attachment body, and
the base further includes a guide member formed including left and right side guide parts configured to, around the joint surface, protrude toward an attachment body side, and when moving up or down for the magnetic attachment, guide a position of the attachment body in a left-right direction, and a lower guide part configured to guide a downward position.

2. The coupler according to claim 1, wherein
the base includes:
a main body that contains two magnets having different surface poles and forms the back surface;
the guide member that blocks a front surface side of the main body and forms the joint surface; and
the fixing member provided on the back surface of the main body, and the attachment body includes:
an attachment main body that contains two magnets that are to be attracted and guided by the base magnets, and faces to the base; and
a lid plate that blocks the attachment body magnets of the attachment main body and forms the joint surface.

3. The coupler according to claim 1, wherein
the engaging part of the attachment body is a protrusion that is provided below the joint surface and protrudes downward, and the engaging part of the base includes a hole provided below the joint surface and configured to disengageably engage with the protrusion from above and a hole wall part configured to restrict separation from an engagement state and downward movement.

4. The coupler according to claim 1, wherein
the engaging part of the base and the engaged part of the attachment body are provided above the joint surface of the base and above the joint surface of the attachment body, respectively, and one is a hook part protruding the joint surface, whereas the other includes an opening part into or out of which the hook part is capable of being moved by joint direction relative movement, and a locking part that protrudes into the opening part and is configured to be disengageably engaged with the hook part and restrict separation from an engagement state and downward movement.

5. The coupler according to claim 4, wherein
the base is provided with a locking mechanism that enables the hook part to be inserted into the opening part and engage with the locking part, and is configured to, when engaging with the locking part, restrict the hook part from relatively moving in a detachment direction.

6. The coupler according to claim 5, wherein
the attachment body is formed with the hook part, and the base is formed with the opening part and the locking part,
the locking mechanism includes: a locking hole formed in the hook part; an engaging pin that is provided to the base and by protruding into the opening part, inserted into the locking hole to restrict the hook part from relatively moving in the detachment direction; and a spring that biases the engaging pin in a protruding direction, and
the hook part is formed with a tilt surface that when inserted into the opening part to engage with the engaging part, touches the engaging pin to move back the engaging pin from the opening part.

7. The coupler according to claim 5, wherein
the base is formed with the hook part, the attachment body is formed with the opening part, the locking part protruding downward from an upper edge of the opening part, and a lock part protruding toward one side from a side edge of the opening part, and the lock part is formed with an inclined reception surface, and
the locking mechanism includes: an operation body that is provided in the base, faces to the hook part, sandwiching the locking part, and thereby restricts the hook part from relatively moving in the detachment direction; a spring that biases the operation body to a position facing to the hook part; and an operation knob configured to move back the operation body from the position facing to the hook part while resisting the spring, and
the operation body is formed with an inclined touch surface that when the hook part is inserted into the opening part and engages with the locking part, touches the inclined reception surface of the lock part, and moves back the hook part from a position where the hook part is restricted from moving.

8. The coupler according to claim 6, wherein
the locking mechanism includes: an operation knob slidably attached to the base; and an interlocking member configured to move back the engaging pin from the opening part by sliding of the operation knob, and
the operation knob is arranged on a side opposite in left-right to the engaging pin, sandwiching the opening part of the base.

9. The coupler according to claim 1, wherein
the attachment tool includes: a male screw part that is rotationally movably provided to the attachment body and capable of being operated so as to be screwed to the attaching target from outside the attachment body, or a movable claw that is provided on the front surface of the attachment body and capable of being operated so as to sandwich the attaching target from outside the attachment body.

10. A coupler comprising:

a base to be fixed to an attached target; and an attachment body that is fixed to an attaching target and to be detachably joined to the base, wherein:

the base includes a joint surface to be joined to the attachment body, a magnet configured to magnetically attach the attachment body to the joint surface, and an engaging part configured to engage with the attachment body, the attachment body includes a joint surface to be joined to the base, a magnet configured to magnetically attach the magnet of the base to the joint surface, and an engaged part configured to disengageably engage with the engaging part of the base and restrict separation from the base, the engaging part of the base and the engaged part of the attachment body are provided above the joint surface of the base and above the joint surface of the attachment body, respectively, and one is a hook part protruding the joint surface, whereas the other includes an opening part into or out of which the hook part is capable of being moved by joint direction relative movement, and a locking part that protrudes into the opening part and is configured to be engaged with the hook part, the base is provided with a locking mechanism configured to restrict the hook part engaging with the locking part from relatively moving in a detachment direction, the base is formed with the hook part, and the attachment body is formed with the opening part and the locking part, and the locking mechanism includes: an operation body that is provided in the base, faces to the hook part, sandwiching the locking part, and thereby restricts the hook part from relatively moving in the detachment direction; a spring that biases the operation body to a position facing to the hook part; and an operation knob configured to move back the operation body from the position facing to the hook part while resisting the spring.

* * * * *